United States Patent
Takano et al.

(10) Patent No.: US 12,532,194 B2
(45) Date of Patent: Jan. 20, 2026

(54) INFORMATION PROCESSING DEVICE, BASE STATION DEVICE, COMMUNICATION METHOD, AND COMMUNICATION SYSTEM

(71) Applicant: SONY GROUP CORPORATION, Tokyo (JP)

(72) Inventors: Hiroaki Takano, Tokyo (JP); Hiroto Kuriki, Tokyo (JP); Shinichiro Tsuda, Tokyo (JP)

(73) Assignee: SONY GROUP CORPORATION, Tokyo (JP)

(*) Notice: Subject to any disclaimer, the term of this patent is extended or adjusted under 35 U.S.C. 154(b) by 305 days.

(21) Appl. No.: 18/042,387

(22) PCT Filed: Aug. 3, 2021

(86) PCT No.: PCT/JP2021/028758
§ 371 (c)(1),
(2) Date: Feb. 21, 2023

(87) PCT Pub. No.: WO2022/044722
PCT Pub. Date: Mar. 3, 2022

(65) Prior Publication Data
US 2023/0337016 A1    Oct. 19, 2023

(30) Foreign Application Priority Data
Aug. 31, 2020   (JP) .................... 2020-146427

(51) Int. Cl.
*H04W 24/02* (2009.01)
*H04W 56/00* (2009.01)

(52) U.S. Cl.
CPC ......... *H04W 24/02* (2013.01); *H04W 56/005* (2013.01)

(58) Field of Classification Search
CPC ... H04W 24/02; H04W 56/005; H04W 56/00; H04W 52/02
See application file for complete search history.

(56) References Cited

U.S. PATENT DOCUMENTS

| | | | | |
|---|---|---|---|---|
| 2013/0275877 A1* | 10/2013 | Varner | .................... | H04L 47/26 715/736 |
| 2017/0055212 A1* | 2/2017 | Yan | ........................ | H04W 72/21 |
| 2017/0164288 A1* | 6/2017 | Iwai | .................. | H04W 52/0261 |

FOREIGN PATENT DOCUMENTS

| | | |
|---|---|---|
| JP | 2019-057929 A | 4/2019 |
| WO | 2016/009580 A1 | 1/2016 |

OTHER PUBLICATIONS

International Search Report and Written Opinion of PCT Application No. PCT/JP2021/028758, issued on Nov. 2, 2021, 08 pages of ISRWO.

* cited by examiner

*Primary Examiner* — Jamal Javaid
(74) *Attorney, Agent, or Firm* — CHIP LAW GROUP

(57) ABSTRACT

Provided is an information processing device that includes a control unit. The control unit acquires information from a device that provides an application function to a terminal device. The control unit notifies a base station device that communicates with the terminal device of setting information regarding intermittent reception of the terminal device using an application programming interface (API) on the basis of the information.

15 Claims, 18 Drawing Sheets

FIG. 14
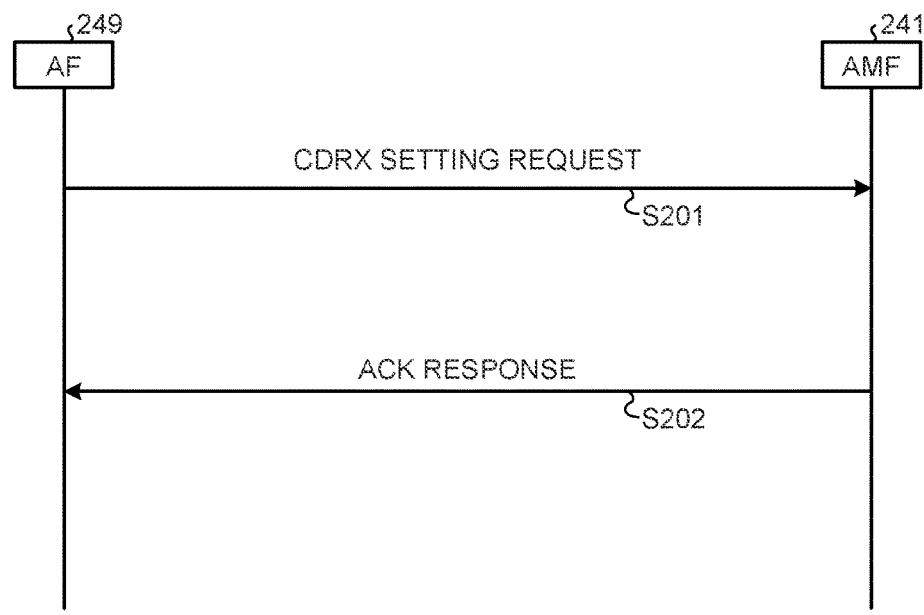
FIG. 15A
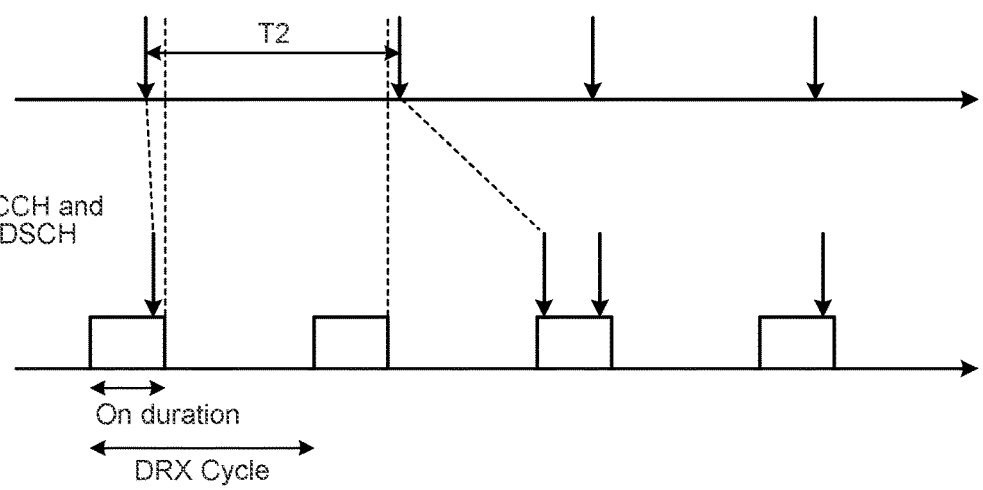
FIG. 15B

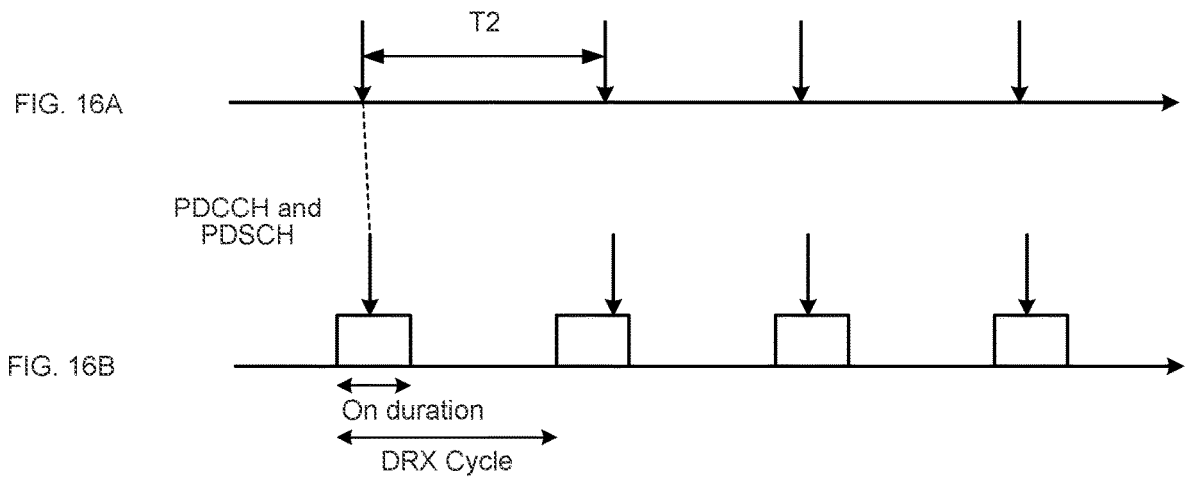
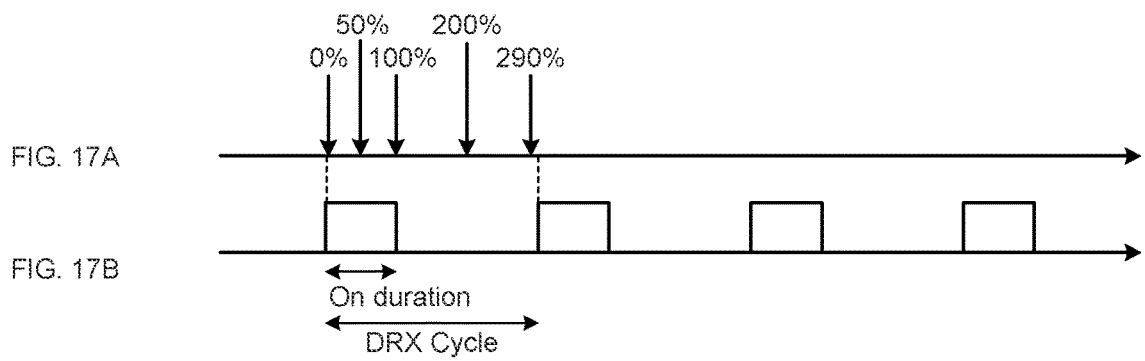

INFORMATION PROCESSING DEVICE, BASE STATION DEVICE, COMMUNICATION METHOD, AND COMMUNICATION SYSTEM

CROSS REFERENCE TO RELATED APPLICATIONS

This application is a U.S. National Phase of International Patent Application No. PCT/JP2021/028758 filed on Aug. 3, 2021, which claims priority benefit of Japanese Patent Application No. JP 2020-146427 filed in the Japan Patent Office on Aug. 31, 2020. Each of the above-referenced applications is hereby incorporated herein by reference in its entirety.

FIELD

The present disclosure relates to an information processing device, a base station device, a communication method, and a communication system.

BACKGROUND

Next-generation mobile communication systems that can be used by various entities according to regional and individual needs are being studied. The next-generation mobile communication system includes, for example, a mechanism in which various entities such as local companies and local governments can flexibly construct and use a network in a spot manner in their own buildings and sites, separately from the 5G service for the whole country by mobile phone operators.

CITATION LIST

Patent Literature

Patent Literature 1: JP 2019-57929 A

SUMMARY

Technical Problem

When a network is constructed in a spot manner, a plurality of networks simultaneously exist, and a server that provides an application function to a terminal device may simultaneously communicate with a terminal device connected to a different network. For example, in a case where terminal devices connected to different networks play a game simultaneously, communication is performed simultaneously with the same game server.

In a case where a plurality of terminal devices is connected to one server in synchronization, such as a case where a network game is performed, there is a risk that a delay amount generated in communication with the server differs for each terminal device. At this time, for example, if the delay amount of each terminal device is constant, a plurality of terminal devices can communicate with the server in synchronization by considering the delay in advance on the server side. However, if the delay fluctuates, the delay amount is not fixed, and it may be difficult for a plurality of terminal devices to communicate with the server in synchronization.

As described above, there has been a demand for suppressing fluctuation in delay in a case where a plurality of terminal devices communicates with a server in synchronization.

Therefore, the present disclosure provides a mechanism capable of further suppressing delay fluctuation.

Solution to Problem

According to the present disclosure, an information processing apparatus is provided. The information processing device includes a control unit. The control unit acquires information from a device that provides an application function to a terminal device. The control unit notifies a base station device that communicates with the terminal device of setting information regarding intermittent reception of the terminal device using an application programming interface (API) on the basis of the information.

BRIEF DESCRIPTION OF DRAWINGS

FIG. 14 is a sequence diagram illustrating an example of a flow of the CDRX setting request process according to an embodiment of the present disclosure.

FIGS. 15A and 15B are diagrams for explaining fluctuation in delay according to a second embodiment of the present disclosure.

FIGS. 16A and 16B are diagrams for explaining a reception timing of video data by the terminal device according to the second embodiment of the present disclosure.

FIGS. 17A and 17B are diagrams for describing an arrival timing of data notified by a base station device according to a second embodiment of the present disclosure.

DESCRIPTION OF EMBODIMENTS

Figure 1:
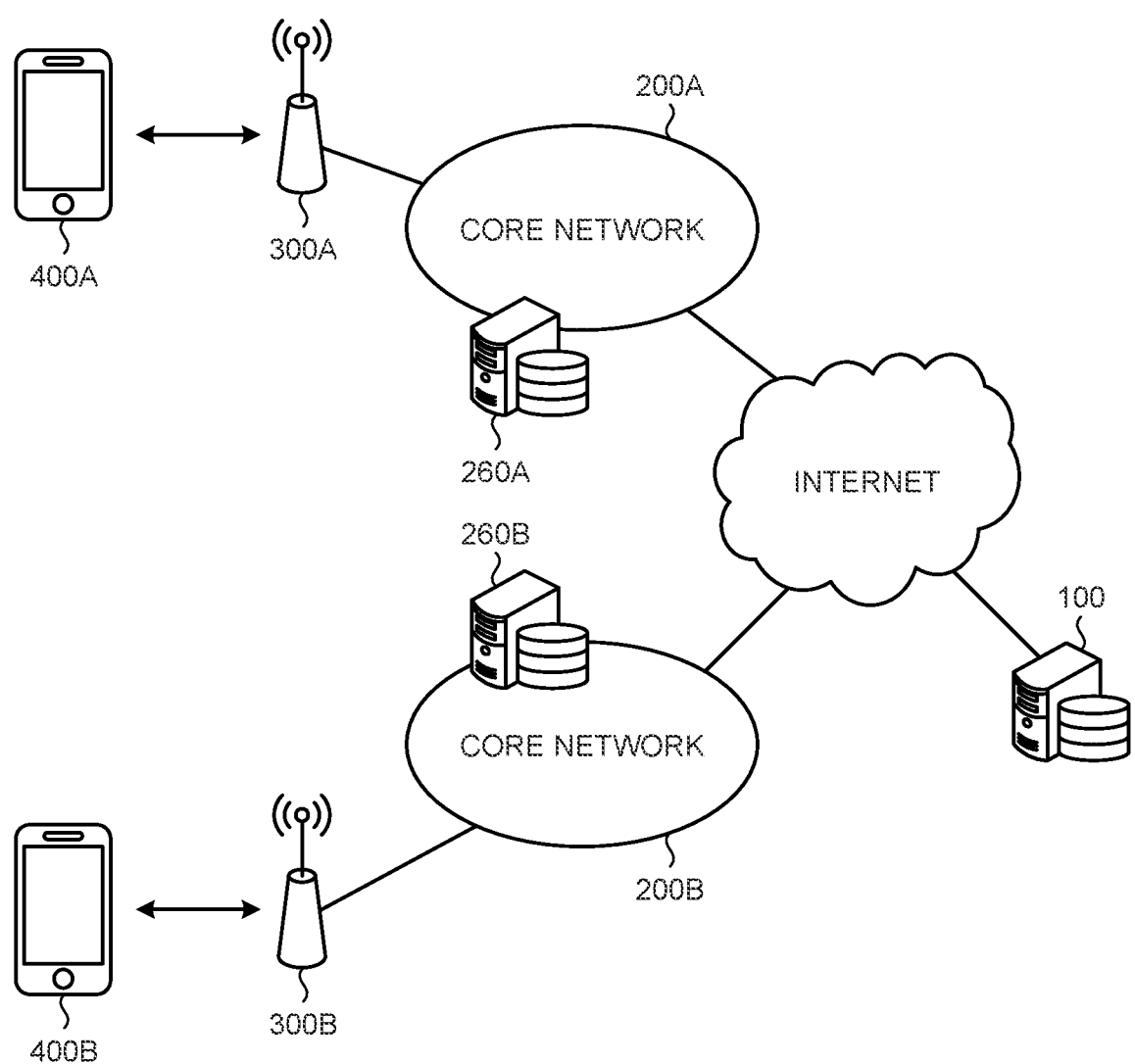
FIG. 1 is a diagram for describing an overview of a communication system 1 according to an embodiment of the present disclosure.

Hereinafter, embodiments of the present disclosure will be described in detail with reference to the accompanying drawings. Note that, in the present specification and the drawings, components having substantially the same functional configuration are denoted by the same reference numerals, and redundant description is omitted.

In addition, in the present specification and the drawings, similar components of the embodiments may be distinguished by attaching different alphabets after the same reference numerals. However, in a case where it is not necessary to particularly distinguish each of similar components, only the same reference numeral is assigned.

One or more embodiments (including examples and modifications) described below can each be realized independently. On the other hand, at least some of the plurality of embodiments described below may be appropriately combined with at least some of other embodiments. The plurality of embodiments may include novel features different from each other. Therefore, the plurality of embodiments can contribute to solving different objects or problems, and can exhibit different effects.

Note that the description will be given in the following order.

1. Overview
1.1. Schematic configuration of system
1.2. Overview of Proposed Technology
2. Configuration example of communication system
2.1. Configuration example of network architecture
2.2. Private 5G
2.3. Information processing device
2.4. Base station device
2.5. Terminal device
3. First Embodiment
4. Second Embodiment
5. Third Embodiment
6. Fourth Embodiment
7. Modification 1. Overview <1.1. Schematic Configuration of System>

First, an overview of a communication system 1 according to an embodiment of the present disclosure will be described with reference to FIG. 1. FIG. 1 is a diagram for describing an overview of the communication system 1 according to an embodiment of the present disclosure.

In the example illustrated in FIG. 1, the communication system 1 includes an information processing device 100, core networks 200A and 200B, base station devices 300A and 300B, and terminal devices 400A and 400B.

The information processing device 100 is a server (device) that provides the terminal device 400 with an application function. Hereinafter, the information processing device 100 is referred to as an application server 100.

The application server 100 performs communication in synchronization with the plurality of terminal devices 400. For example, the application server 100 is a game server that provides a network game to the plurality of terminal devices 400. In this case, the application server 100 distributes, for example, Augmented Reality (AR)/Virtual Reality (VR) data, which is game data, to the plurality of terminal devices 400 in synchronization.

Furthermore, the application server 100 can be, for example, a server for Internet of Things (IoT) control. For example, the application server 100 may be a control server that causes a plurality of automobiles (an example of the terminal device 400) to travel in line. In this case, for example, the application server 100 controls the plurality of automobiles in synchronization with the timing. For example, the application server 100 synchronously distributes IoT control information (for example, control information of an automobile) to the plurality of terminal devices 400.

The core network 200 is a local cellular network such as a local 5G or a local 4G. The core network 200 includes, for example, an information processing device 260 having a function of an application function (AF) node.

The information processing device 260 transmits the transmission data transmitted by the application server 100 to the terminal device 400. For example, the information processing device 260 may be a push notification server that transmits transmission data to the terminal device 400 by push notification.

The base station device 300 is a wireless communication device that performs wireless communication with the terminal device 400. The base station device 300 is a type of communication device. Furthermore, the base station device 300 is a type of information processing device.

The terminal device 400 is a wireless communication device that performs wireless communication with the base station device 300. The terminal device 400 is, for example, a mobile phone, a smart device (smartphone or tablet), a personal digital assistant (PDA), or a personal computer as the terminal device 400. Furthermore, the terminal device 400 may be an M2M (Machine to Machine) device or an IoT (Internet of Things) device. Furthermore, the terminal device 400 may be a head mounted display, VR goggles, or the like.

The terminal device 400 is connected to the core network 200 via the base station device 300.

<1.2. Overview of Proposed Technology>

In the communication system 1 illustrated in FIG. 1, when the application server 100 and the terminal device 400 communicate with each other, a communication delay occurs between the application server 100 and the terminal device 400. At this time, when the plurality of terminal devices 400A and 400B are connected to different core networks 200A and 200B as illustrated in FIG. 1, the communication delay amount may be different between the terminal devices 400A and 400B.

For example, when the communication delay amount is constant in the terminal devices 400A and 400B, the application server 100 adjusts the data transmission in consideration of the delay amount, so that the terminal devices 400A and 400B can synchronously distribute the data.

However, when the communication delay amounts of the terminal devices 400A and 400B fluctuate, it becomes difficult to adjust data transmission on the application server 100 side, and it becomes difficult to distribute data synchronized in the terminal devices 400A and 400B.

Such fluctuation in the communication delay amount is likely to occur, for example, when the terminal devices 400A and 400B perform intermittent reception (for example, connected DRX (Discontinuous Transmission)). If the reception timings of the terminal devices 400A and 400B performing intermittent reception are different from each other, the terminal devices 400A and 400B cannot synchronously receive data, and there is a risk that a fluctuation in a communication delay amount occurs. Note that details of the fluctuation in the communication delay amount will be described later.

In particular, in the conventional terminal devices 400A and 400B, when the core network 200 to be connected is different, it is difficult to synchronize the reception timings of the intermittent reception.

Therefore, the information processing device 260 according to the embodiment of the present disclosure receives information from the application server 100. The information processing device 260 notifies the base station device 300 that communicates with the terminal device 400 of the setting information regarding the intermittent reception of the terminal device 400 on the basis of the received information.

Note that the information received by the information processing device 260 from the application server 100 can include, for example, information specifying the terminal device 400 to be synchronized and information regarding the timing of transmitting data.

Furthermore, the information processing device 260 notifies the base station device 300 of the setting information via an access management function (AMF) node (not illustrated), for example. Alternatively, the information processing device 260 may have the function of the AMF and directly notify the base station device 300 of the setting information.

As a result, the information processing device 260 can align the timing of the intermittent reception of the terminal device 400, and can suppress fluctuation in the communication delay amount.

2. Configuration Example of Communication System

<2.1. Configuration Example of Network Architecture>

Figure 2:
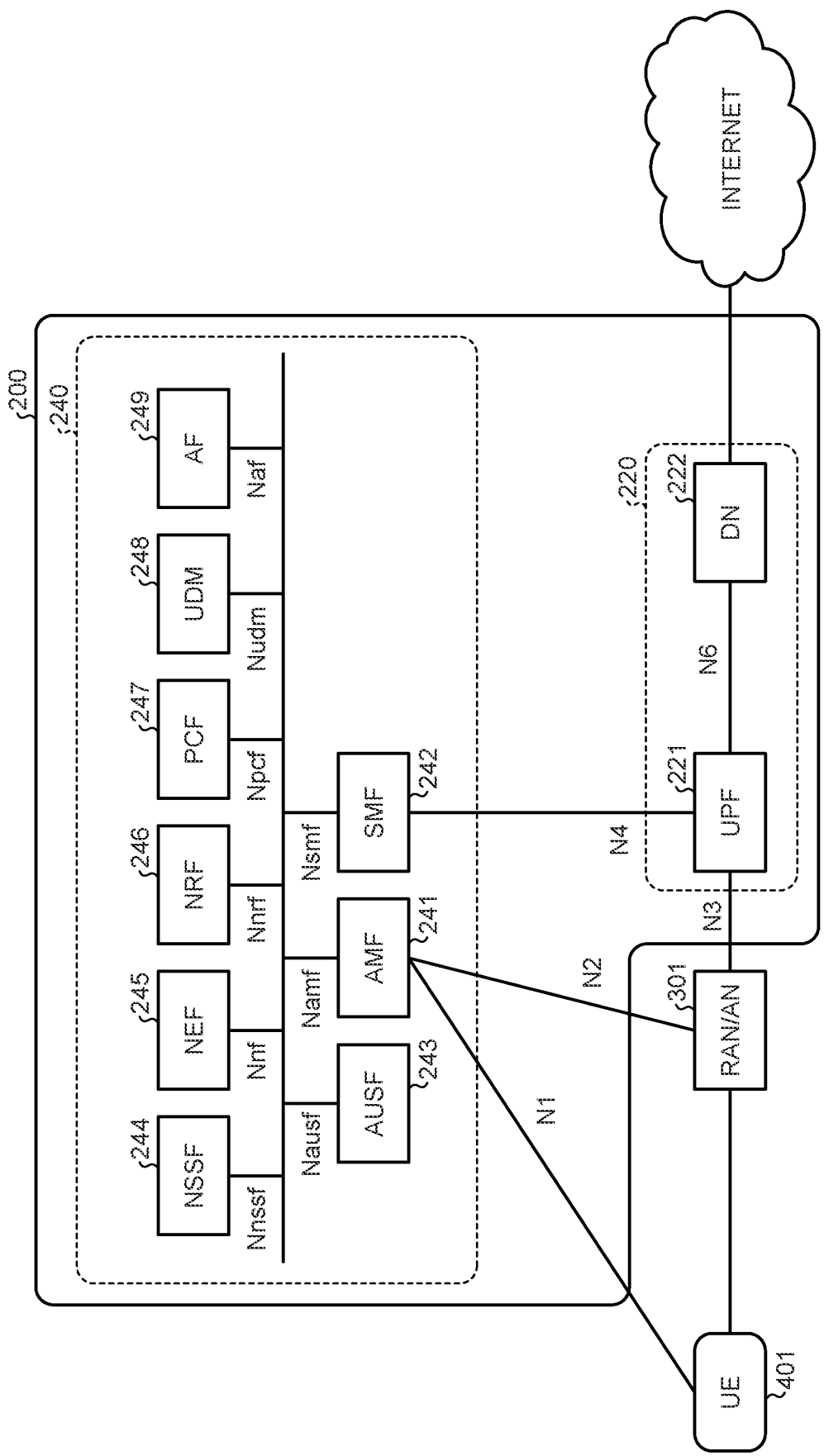
FIG. 2 is a diagram illustrating an example of 5G architecture.

Next, an architecture of a fifth generation mobile communication system (5G) will be described as an example of the core network 200 of the communication system 1 with reference to FIG. 2. FIG. 2 is a diagram illustrating an example of 5G architecture. The 5G core network 200 is also referred to as 5GC (5G Core)/NGC (Next Generation Core). Hereinafter, the 5G core network 200 is also referred to as a 5GC/NGC 200. The 5GC/NGC 200 is connected to user equipment (UE) 401 via a (R)AN 301.

The (R)AN 301 has a function of enabling connection to a radio access network (RAN) and connection to an access network (AN) other than the RAN. The (R)AN 301 includes a base station device called a gNB or an ng-eNB.

The 5GC/NGC 200 mainly performs connection permission and session management when the UE 401 connects to the network. The 5GC/NGC 200 may include a user plane function group 220 and a control plane function group 240.

The user plane function group 220 includes a user plane function (UPF) 221 and a data network (DN) 222. The UPF 221 has a function of user plane processing. The UPF 221 includes a routing/forwarding function of data handled in a user plane. The DN 222 has a function of providing an entity, such as a mobile network operator (MNO), which provides a connection to an operator's own service, providing an Internet connection, or providing a connection to a third party service. As described above, the user plane function group 220 serves as a gateway serving as a boundary between the 5GC/NGC 200 and the Internet.

The control plane function group 240 includes an access management function (AMF) 241, a session management function (SMF) 242, an authentication server function (AUSF) 243, a network slice selection function (NSSF) 244, a network exposure function (NEF) 245, a network repository function (NRF) 246, a policy control function (PCF) 247, a unified data management (UDM) 248, and an application function (AF) 249.

The AMF 241 has functions such as registration process, connection management, and mobility management of the UE 401. The SMF 242 has functions such as session management and IP assignment and management of the UE 401. The AUSF 243 has an authentication function. The NSSF 244 has a function related to selection of a network slice. The NEF 245 has a function of providing network function capabilities and events to a third party, the AF 249, and edge computing functions.

The NRF 246 has a function of finding a network function and holding a profile of the network function. The PCF 247 has a function of policy control. The UDM 248 has functions of generating 3GPP AKA authentication information and processing a user ID. The AF 249 has a function of interacting with the core network to provide a service.

For example, the control plane function group 240 acquires information from the UDM 248 in which the subscriber information of the UE 401 is stored, and determines whether or not the UE 401 may connect to the network. The control plane function group 240 uses the contract information of the UE 401 and the key for encryption included in the information acquired from the UDM 248 for such determination. In addition, the control plane function group 240 generates a key for encryption and the like.

That is, the control plane function group 240 determines whether or not the network can be connected according to whether or not information of the UE 401 associated with a subscriber number called international mobile subscriber identity (IMSI) is stored in the UDM 248, for example. Note that the IMSI is stored in, for example, a subscriber identity module (SIM) card in the UE 401.

Here, Namf is a service-based interface provided by the AMF 241, and Nsmf is a service-based interface provided by the SMF 242. In addition, Nnef is a service-based interface provided by the NEF 245, and Npcf is a service-based interface provided by the PCF 247. Nudm is a service-based interface provided by the UDM 248, and Naf is a service-based interface provided by the AF 249. Nnrf is a service-based interface provided by the NRF 246, and Nnssf is a service-based interface provided by the NSSF 244. Nausf is a service-based interface provided by the AUSF 243. Each of these network functions (NFs) exchanges information with another NF via each service-based interface.

In addition, N1 illustrated in FIG. 1 is a reference point between the UE 401 and the AMF 241, and N2 is a reference point between the RAN/AN 301 and the AMF 241. N4 is a reference point between the SMF 242 and the UPF 221, and information is exchanged between these network functions (NFs).

As described above, in the 5GC/NGC 200, an interface for transmitting information and controlling functions via an application programming interface (API) called a service-based interface is prepared.

The API specifies a resource and enables GET (resource acquisition), POST (Creation of resource and addition of data), PUT (create resource, update resource), DELETE (resource deletion), and the like for the resource. Such a function is generally used, for example, in the technical field related to the Web.

For example, when establishing a communication session, the AMF 241, the SMF 242, and the UDM 248 illustrated in FIG. 2 exchange information with each other using the API. Conventionally, it is not assumed that an application (for example, the AF 249) uses such an API. However, when the AF 249 uses such an API, the AF 249 can use information of a 5G cellular network, and it is considered that a function of an application can be further evolved.

Note that it is difficult for the AF 289 to use the API used by the AMF 241, the SMF 242, and the UDM 248 in the Public Network. However, in the case of a non-public private 5G network, it is considered that the system can be configured including, for example, a change in the API of the 5GC/NGC 200 so that the AF 289 can use such an API.

Here, an example of the API will be described. The API(1) to API(4) described here are described in 3GPP TS 23.502.

[API(1)]

The API(1) is an API in which the SMF 242 notifies that the UE 401 registered in advance transitions from the power off state to the power on state and attaches to the network and the IP address acquired at that time.

The SMF 242 notifies the NF of the IP address when the UE 401 of the registered IMSI acquires the IP address by using the API(1).

[API (2)]

The UE 401 enters the Idle mode when not communicating, and transitions to the Connected mode when communicating. The API(2) is an API in which the AMF 241 notifies whether the UE 401 is in the Idle mode or the Connected mode.

[API(3)]

The API(3) is an API for broadcasting a message (Paging message) for instructing the UE 401 to transition from the Idle mode to the Connected mode from the base station.

[API(4)]

The API(4) is an API in which the AMF 241 provides the location information of the UE 401. The AMF 241 may use the API(4) to inform which tracking area the UE 401 is in, which cell it belongs to, and when it enters a specific region.

Note that an example of the UE 401 in FIG. 2 is the terminal device 400 of the present embodiment. An example of the RAN/AN 301 is the base station device 300 according to the present embodiment.

Furthermore, the information processing device 260 illustrated in FIG. 1 is an example of a device having the function of, for example, the AF 249 or the AMF 241. The application server 100 is connected to the core network 200 via the Internet, and is not illustrated in FIG. 2.

Figure 3:
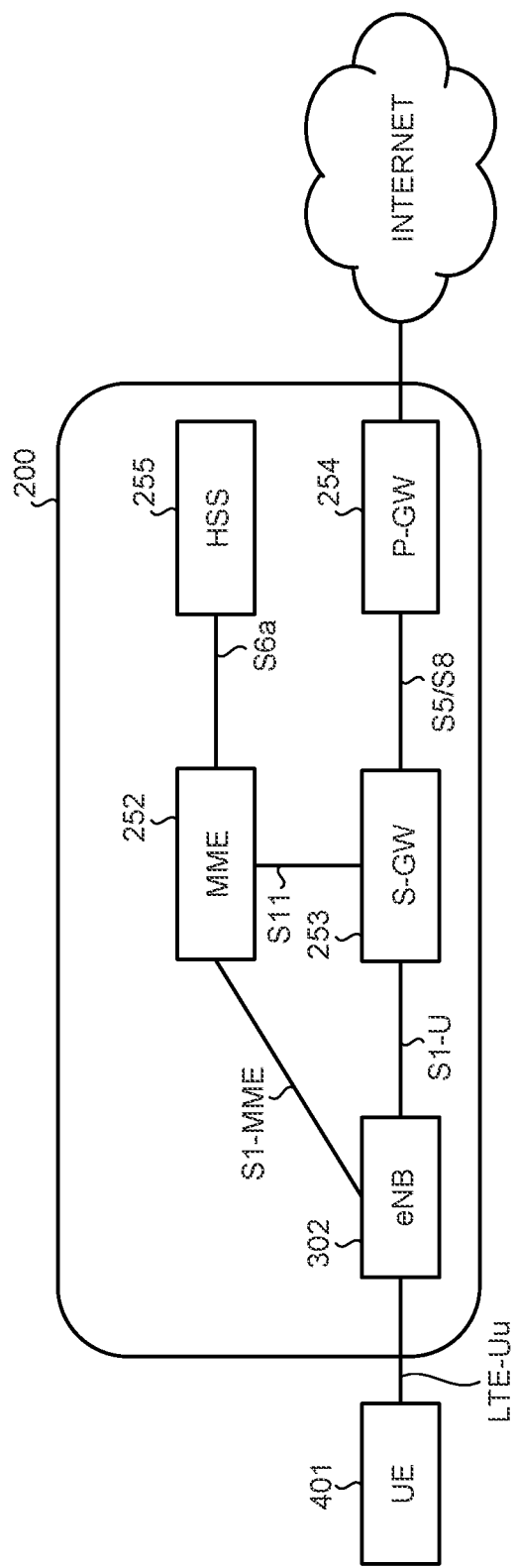
FIG. 3 is a diagram illustrating an example of a 4G architecture.

An architecture of a fourth generation mobile communication system (4G) will be described as an example of the core network 200 of the communication system 1 with reference to FIG. 3. FIG. 3 is a diagram illustrating an example of a 4G architecture.

As illustrated in FIG. 3, the core network 200 includes an eNB 302, a mobility management entity (MME) 252, a serving gateway (S-GW) 253, a packet data network gateway (P-GW) 254, and a home subscriber server (HSS) 255.

The eNB 302 functions as a 4G base station. The MME 252 is a control node that handles signals of a control plane (control plane) and manages a movement state of the UE 401. The UE 401 sends an Attach request to the MME 252 to attach to the cellular system.

The S-GW 253 is a control node that handles user plane signals, and is a gateway device that switches a transfer path of user data. The P-GW 254 is a control node that handles user plane signals and is a gateway device serving as a connection point between the core network 200 and the Internet. The HSS 255 is a control node that handles subscriber data and performs service control.

The MME 252 corresponds to the functions of the AMF 241 and the SMF 242 in the 5G network. In addition, the HSS 255 corresponds to the function of the UDM 248.

As illustrated in FIG. 3, the eNB 302 is connected to the MME 252 via the S1-MME interface, and is connected to the S-GW 253 via the S1-U interface. The S-GW 253 is connected to the MME 252 via the S11 interface, and the MME 252 is connected to the HSS 255 via the S6a interface. The P-GW 254 is connected to the S-GW 253 via an S5/S8 interface.

<2.2. Private 5G>

A part of the communication system 1 according to the embodiment of the present disclosure can adopt the Private 5G or the Private 4G. Currently, in a local area network (LAN), a wireless LAN conforming to 802.11 standards is used. The Private 5G or the Private 4G is a cellular system in which a base station device 300 (for example, the RAN/AN 301 of FIG. 2 or the eNB 302 of FIG. 3) of the cellular system is installed and operated in the LAN. In the 3GPP, the Private 5G or the Private 4G is referred to as a non-public network. Note that, in the following description, it is assumed that a part of the communication system 1 adopts the Private 5G.

Figure 4:
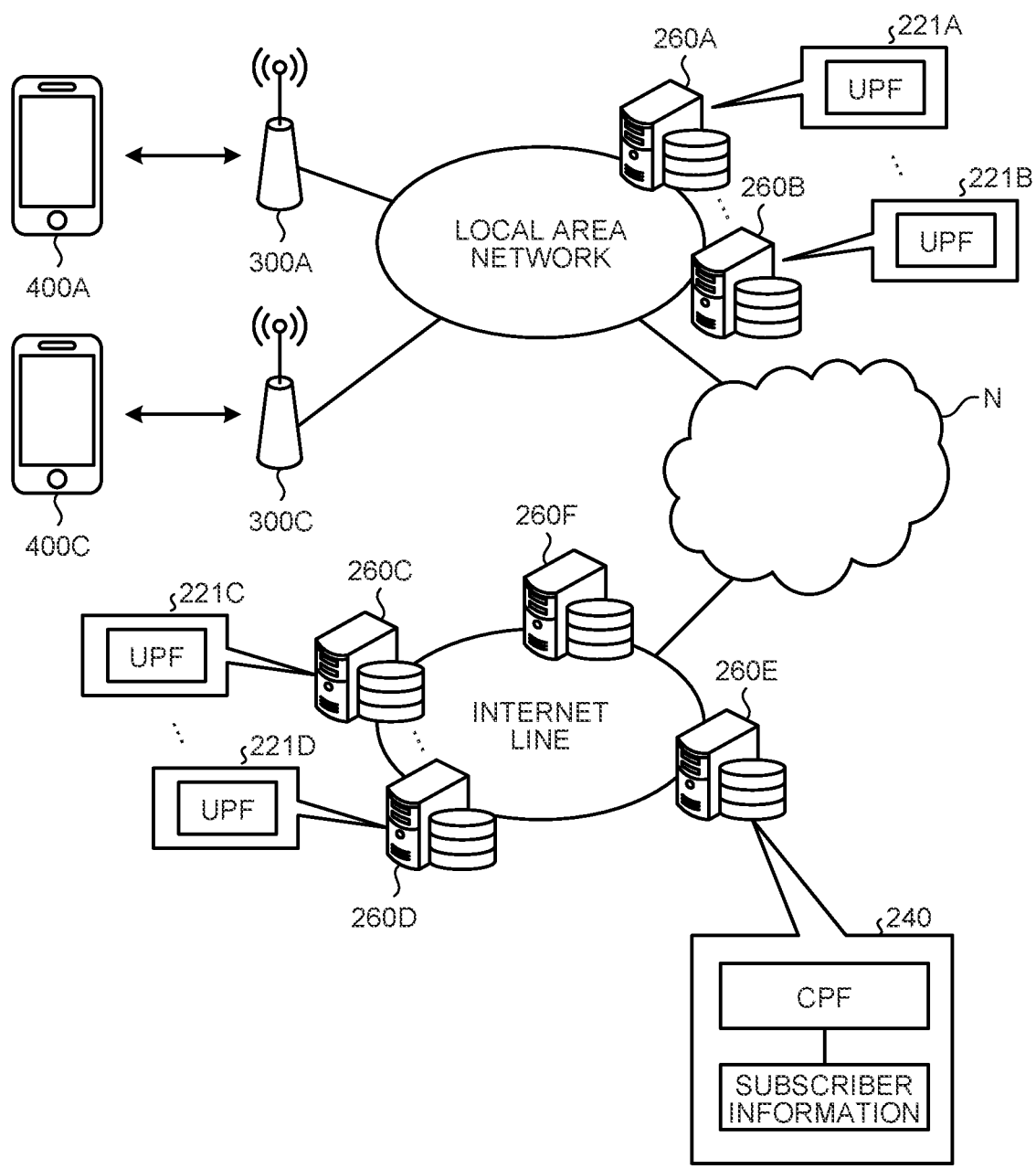
FIG. 4 is a diagram for describing a configuration example of a private 5G according to the embodiment of the present disclosure.

A case where Private 5G is adopted as a cellular system (a system including the base station device 300 and the core network 200) in the communication system 1 according to the embodiment of the present disclosure will be described with reference to FIG. 4. FIG. 4 is a diagram for describing a configuration example of the Private 5G according to the embodiment of the present disclosure.

In the Private 5G, the base station device 300, the terminal device 400, and the information processing devices 260A and 260B having some functions of the core network 200 are arranged in a local area network (LAN). In addition, the information processing devices 260C to 260F having the functions of the remaining core network 200 are arranged, for example, in a cloud data center of the Internet line.

In the example of FIG. 4, the information processing devices 260A and 260B having the functions of the UPFs 221A and 221B are arranged in a local area network (LAN). The information processing devices 260C and 260D having the functions of the UPFs 221C and 221D are arranged on the cloud on the Internet line. In addition, the information processing device 260E functioning as the control plane function group 240 is arranged on the cloud of the Internet line. Furthermore, the information processing device 260F having the function of the AF 249 (for example, corresponding to the information processing device 260 in FIG. 1) may be arranged on the cloud separately from the information processing device 260E functioning as the control plane function group 240.

Note that the UPFs 221A and 221B arranged in the local area network exist in the local area network when the control plane function group 240 is started or when the operation of the core network 200 is started. On the other hand, the UPFs 221C and 221D arranged on the cloud do not exist on the cloud when the control plane function group 240 is started or when the operation of the core network 200 is started. The UPFs 221C and 221D are functions that are started after the control plane function group 240 is started or after the operation of the core network 200 is started, for example.

The local area network (LAN) of FIG. 4 is arranged in, for example, an office, a factory, or a private home. A local area network (LAN) is connected to the Internet line via, for example, a network N.

A private IP address is assigned to the base station device 300 and the core network 200. The base station device 300 and the core network 200 communicate with each other using a private IP address. For example, by using a technology such as a virtual private network, the base station device 300 and the core network 200 can communicate with each other using a private IP address. That is, the network connecting the base station device 300 and the core network 200 can be regarded as a private network (closed network).

Note that, in FIG. 4, a part (UPF 221A and 221B) of the base station device 300, the terminal device 400, and the UPF 221 is arranged in the local area network. In addition, although a part (UPF 221C and 221D) of the control plane function group 240 and the UPF 221 is arranged on the cloud, the arrangement is not limited thereto. The base station device 300 and the terminal device 400 may be arranged in a local area network, and the functions of the UPFs 221A and 221B may be realized on the cloud. In addition, at least some functions of the control plane function group 240 may be realized on a local area network.

As described above, the communication system 1 according to the embodiment of the present disclosure is a system in which an application on the network side transmits data to a plurality of terminal devices 400 using different Private 5Gs. In the embodiment of the present disclosure, for example, a use case is assumed in which the application server 100 (see FIG. 1) simultaneously distributes control information for controlling a device, video information of a game, and the like to a plurality of terminal devices 400.

More specifically, the application server 100 disposed outside the private 5G notifies the terminal device 400 of data via the information processing device 260F disposed in the private 5G. Therefore, it can also be said that the information processing device 260F is a Push Notification server arranged in the Private 5G. Note that Push Notification is a technology in which a network serves as a starting point to transmit a message (an example of data) to the terminal device 400.

<2.3. Information Processing Device>

Figure 5:
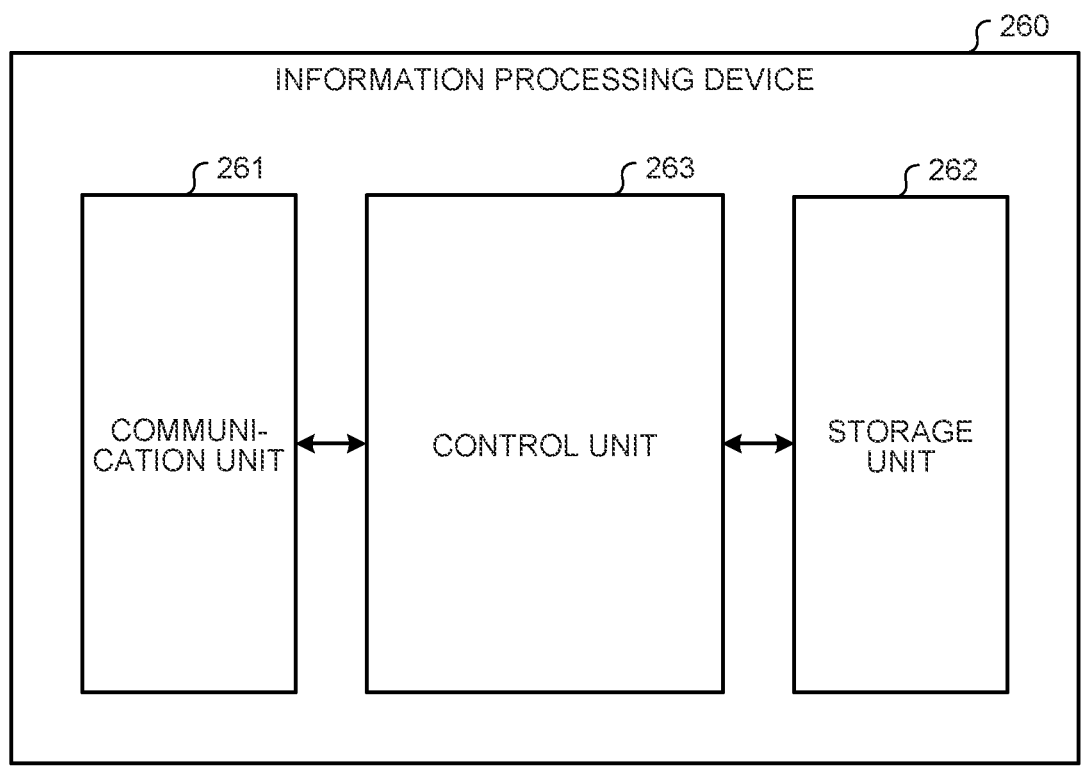
FIG. 5 is a block diagram illustrating a configuration example of an information processing device according to an embodiment of the present disclosure.

Next, a configuration example of the information processing device 260 according to the embodiment of the present disclosure will be described with reference to FIG. 5. FIG. 5 is a block diagram illustrating a configuration example of the information processing device 260 according to the embodiment of the present disclosure.

The information processing device 260 is a device that realizes a function of NF or AF of the core network 200. The information processing device 260 is, for example, a server device. The information processing device 260 may be a device collectively referred to as a cloud server or an edge server.

As illustrated in FIG. 5, the information processing device 260 includes a communication unit 261, a storage unit 262, and a control unit 263. Note that the configuration illustrated in FIG. 5 is a functional configuration, and the hardware configuration may be different from the functional configuration. Furthermore, the functions of the information processing device 260 may be realized in a distributed manner in a plurality of physically separated configurations. For example, the information processing device 260 may include a plurality of server devices.

The communication unit 261 is a communication interface for communicating with other devices. The communication unit 261 may be a network interface or a device connection interface. For example, the communication unit 261 may be a local area network (LAN) interface such as a network interface card (NIC), or may be a USB interface including a universal serial bus (USB) host controller, a USB port, and the like. Furthermore, the communication unit 261 may be a wired interface or a wireless interface. The communication unit 261 functions as a communication unit of the information processing device 260. The communication unit 261 communicates with the base station device 300, another NF node, or an node under the control of the control unit 263.

The storage unit 262 is a data readable/writable storage device such as a dynamic random access memory (DRAM), a static random access memory (SRAM), a flash memory, or a hard disk. The storage unit 262 functions as a storage unit of the information processing device 260.

The control unit 263 is a controller that controls each unit of the information processing device 260. The control unit 263 is realized by, for example, a processor such as a central processing unit (CPU), a micro processing unit (MPU), or a graphics processing unit (GPU). For example, the control unit 263 is realized by a processor executing various programs stored in a storage device inside the information processing device 260 using a random access memory (RAM) or the like as a work area. Note that the control unit 263 may be realized by an integrated circuit such as an application specific integrated circuit (ASIC) or a field programmable gate array (FPGA). Any of the CPU, the MPU, the GPU, the ASIC, and the FPGA can be regarded as a controller.

<2.4. Base Station Device>

Figure 6:
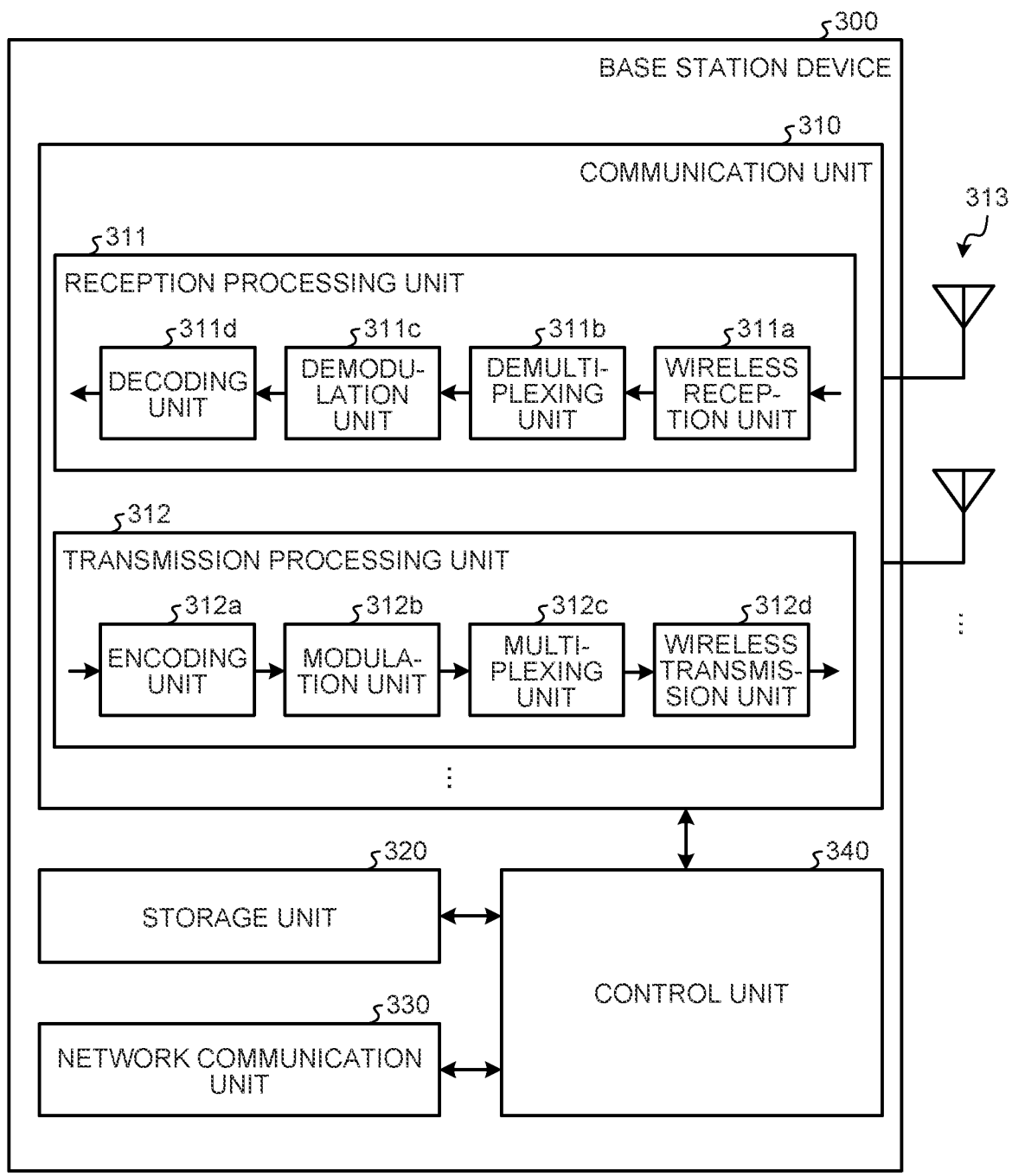
FIG. 6 is a block diagram illustrating a configuration example of a base station device according to an embodiment of the present disclosure.

Next, a configuration example of the base station device 300 according to the embodiment of the present disclosure will be described with reference to FIG. 6. FIG. 6 is a block diagram illustrating a configuration example of the base station device 300 according to the embodiment of the present disclosure.

The base station device 300 is a wireless communication device that performs wireless communication with the terminal device 400. The base station device 300 is a type of communication device. In addition, the base station device 300 is a type of information processing device.

The base station device 300 may be configured by a set of a plurality of physical or logical devices. For example, in the embodiment of the present disclosure, the base station device 300 may be distinguished into a plurality of devices of a baseband unit (BBU) and a radio unit (RU), and may be interpreted as an assembly of the plurality of devices. Additionally or alternatively, in the embodiment of the present disclosure, the base station device 300 may be either or both of a BBU and an RU. The BBU and the RU may be connected by a predetermined interface (for example, eCPRI). Additionally or alternatively, RU may be referred to as Remote Radio Unit (RRU) or Radio DoT (RD). Additionally or alternatively, the RU may correspond to the gNB-DU described later. Additionally or alternatively, the BBU may correspond to a gNB-CU to be described later. Additionally or alternatively, the RU may be a device integrally formed with the antenna. An antenna (for example, an antenna integrally formed with an RU) included in the base station device 300 may adopt an advanced antenna system and support MIMO (for example, FD-MIMO) or beamforming. In the advanced antenna system, an antenna (for example, an antenna integrally formed with an RU) included in the base station device 300 may include, for example, 64 transmission antenna ports and 64 reception antenna ports. In addition, the antenna mounted on the RU may be an antenna panel including one or more antenna elements, and the RU may be mounted with one or more antenna panels. For example, the RU may be mounted with two antenna panels of a horizontally polarized antenna panel and a vertically polarized antenna panel, or two antenna panels of a clockwise circularly polarized antenna panel and a counterclockwise circularly polarized antenna panel. In addition, the RU may form and control an independent beam for each antenna panel.

Furthermore, a plurality of the base station devices 300 may be connected to each other. One or more base station devices 300 may be included in a radio access network (RAN). That is, the base station device 300 may be simply referred to as a RAN, a RAN node, an access network (AN), or an AN node. The RAN in LTE is referred to as an enhanced universal terrestrial RAN (EUTRAN). RAN in NR is referred to as NGRAN. RAN in W-CDMA (UMTS) is referred to as UTRAN. The base station device 300 in LTE is referred to as an evolved node B (eNodeB) or an eNB. That is, the EUTRAN includes one or more eNodeBs (eNBs). Furthermore, the base station device 300 of NR is referred to as a gNodeB or a gNB. That is, the NGRAN includes one or more gNBs. Further, the EUTRAN may include a gNB (en-gNB) connected to a core network (EPC) in an LTE communication system (EPS). Similarly, the NGRAN may include an ng-eNB connected to a core network 5GC in a 5G communication system (5GS). Additionally or alternatively, when the base station device 300 is an eNB, a gNB, or the like, it may be referred to as 3GPP Access. Additionally or alternatively, when the base station device 300 is a wireless access point, it may be referred to as Non-3GPP Access. Additionally or alternatively, the base station device 300 may be an optical extension device called a remote radio head (RRH). Additionally or alternatively, in a case where the base station device 300 is a gNB, the base station device 300 may be referred to as a combination of the above-described gNB CU (Central Unit) and gNB DU (Distributed Unit) or any one of them. The gNB CU (Central Unit) hosts a plurality of upper layers (for example, RRC, SDAP, PDCP) of the Access Stratum for communication with the UE. On the other hand, the gNB-DU hosts a plurality of lower layers (for example, RLC, MAC, PHY) of the Access Stratum. That is, among messages and information described later, RRC signalling (for example, various SIBs including a MIB and a SIB1, an RRC Setup message, and an RRC Reconfiguration message) may be generated by the gNB CU, while DCI and various physical channels (for example, PDCCH, PBCH) described later may be generated by the gNB-DU. Alternatively, in the RRC signalling, for example, some configurations such as IE: cellGroupConfig may be generated by the gNB-DU, and the remaining configurations may be generated by the gNB-CU. These configurations may be transmitted and received by an F1 interface to be described later. The base station device 300 may be configured to be able to communicate with another base station device 300. For example, in a case where the plurality of base station devices 300 are eNBs or a combination of an eNB and an en-gNB, the base station devices 300 may be connected by an X2 interface. Additionally or alternatively, in a case where the plurality of base station devices 300 are gNBs or a combination of a gn-eNB and a gNB, the devices may be connected by an Xn interface. Additionally or alternatively, in a case where the plurality of base station devices 300 is a combination of a gNB central unit (CU) and a gNB distributed unit (DU), the devices may be connected by the above-described F1 interface. Message/information (information included in RRC signalling or DCI) to be described later may be communicated between a plurality of base station devices 300 (for example, via X2, Xn, F1 interface).

Further, as described above, the base station device 300 may be configured to manage a plurality of cells. A cell provided by the base station device 300 is referred to as a serving cell. The serving cell includes a primary cell (PCell) and a secondary cell (SCell). In a case where the dual connectivity (for example, EUTRA-EUTRA Dual Connectivity, EUTRA-NR Dual Connectivity (ENDC), EUTRA-NR Dual Connectivity with 5GC, NR-EUTRA Dual Connectivity (NEDC), and NR-NR Dual Connectivity) is provided to the UE (for example, the terminal device 400), the PCell and zero or one or more SCell(s) provided by the MN (Master Node) are referred to as a master cell group. Further, the serving cell may include a PSCell (Primary Secondary Cell or Primary SCG Cell). In other words, in a case where the dual connectivity is provided to the UE, the PSCell and zero or one or more SCell(s) provided by the SN (Secondary Node) are referred to as a secondary cell group (SCG). Unless specially configured (for example, PUCCH on SCell), the physical uplink control channel (PUCCH) is transmitted in the PCell and the PSCell, but is not transmitted in the SCell. In addition, the radio link failure is also detected in the PCell and the PSCell, but is not detected in the SCell (may not be detected). As described above, since the PCell and the PSCell have a special role in the serving cell(s), they are also referred to as special cells (SpCells). One downlink component carrier and one uplink component carrier may be associated with one cell. In addition, the system bandwidth corresponding to one cell may be divided into a plurality of bandwidth parts. In this case, one or more bandwidth parts (BWP) may be configured for the UE, and one Bandwidth Part may be used for the UE as an Active BWP. Furthermore, radio resources (for example, a frequency band, a numerology (subcarrier spacing), and a slot configuration (slot configuration)) that can be used by the terminal device 400 may be different for each cell, each component carrier, or each BWP.

The base station device 300 illustrated in FIG. 6 includes a communication unit 310, a storage unit 320, a network communication unit 330, and a control unit 340. Note that the configuration illustrated in FIG. 6 is a functional configuration, and the hardware configuration may be different from the functional configuration. Furthermore, the functions of the base station device 300 may be realized in a distributed manner in a plurality of physically separated configurations.

The communication unit 310 is a signal processing unit for wirelessly communicating with another wireless communication device (for example, the terminal device 400 and another base station device 300). The communication unit 310 operates under the control of the control unit 340. When the other wireless communication device is the terminal device 400, the communication unit 310 may be a wireless transceiver supporting one or a plurality of wireless access methods. For example, the communication unit 310 supports both NR and LTE. The communication unit 310 may support W-CDMA or cdma 2000 in addition to NR or LTE. Furthermore, the communication unit 310 may support communication using NOMA. When the other wireless communication device is the other base station device 300, the communication unit 310 may be an X2 interface, an Xn interface, or an F1 interface.

The communication unit 310 includes a reception processing unit 311, a transmission processing unit 312, and an antenna 313. The communication unit 310 may include a plurality of reception processing units 311, a plurality of transmission processing units 312, and a plurality of antennas 313. Note that, in a case where the communication unit 310 supports a plurality of wireless access methods, each unit of the communication unit 310 can be configured individually for each wireless access method. For example, the reception processing unit 311 and the transmission processing unit 312 may be individually configured by LTE and NR.

The reception processing unit 311 processes the uplink signal received via the antenna 313. The reception processing unit 311 operates as a reception unit that receives a reception signal. The reception processing unit 311 includes a wireless reception unit 311a, a demultiplexing unit 311b, a demodulation unit 311c, and a decoding unit 311d.

The wireless reception unit 311a performs, on the uplink signal, down-conversion, removal of an unnecessary frequency component, control of an amplification level, quadrature demodulation, conversion to a digital signal, removal of a guard interval (cyclic prefix), extraction of a frequency domain signal by fast Fourier transform, and the like. The demultiplexing unit 311b demultiplexes an uplink channel such as a physical uplink shared channel (PUSCH) or a physical uplink control channel (PUCCH) and an uplink reference signal from the signal output from the wireless reception unit 311a.

The demodulation unit 311c demodulates the received signal using a modulation method such as binary phase shift keying (BPSK) or quadrature phase shift keying (QPSK) with respect to the modulation symbol of the uplink channel. The modulation method used by the demodulation unit 311c may be 16-quadrature amplitude modulation (QAM), 64QAM, or 256QAM. In this case, the signal points on the constellation do not necessarily have to be equidistant. The constellation may be a non-uniform constellation (NUC).

The decoding unit 311d performs a decoding process on the demodulated encoded bits of the uplink channel. The decoded uplink data and uplink control information are output to the control unit 340.

The transmission processing unit 312 performs a process of transmitting the downlink control information and the downlink data. As described above, the transmission processing unit 312 is an acquisition unit that acquires, for example, a bit sequence of downlink control information, downlink data, or the like from the control unit 340. The transmission processing unit 312 includes an encoding unit 312a, a modulation unit 312b, a multiplexing unit 312c, and a wireless transmission unit 312d.

The encoding unit 312a encodes the downlink control information and the downlink data input from the control unit 340 using an encoding method such as block encoding, convolutional encoding, turbo encoding, or the like. Note that the encoding unit 312a may perform encoding with a polar code and encoding with a low density parity check code (LDPC code).

The modulation unit 312b modulates the encoded bits output from the encoding unit 312a by a predetermined modulation method such as BPSK, QPSK, 16QAM, 64QAM, or 256QAM. In this case, the signal points on the constellation do not necessarily have to be equidistant. The constellation may be a non-uniform constellation.

The multiplexing unit 312c multiplexes the modulation symbol of each channel and the downlink reference signal and arranges the multiplexed symbols in a predetermined resource element. The wireless transmission unit 312d performs various types of signal processing on the signal from the multiplexing unit 312c. For example, the wireless transmission unit 312d performs processing such as conversion from a time domain to a frequency domain by fast Fourier transform, addition of a guard interval (cyclic prefix), generation of a baseband digital signal, conversion to an analog signal, quadrature modulation, up-conversion, removal of an extra frequency component, and power amplification. The signal generated by the transmission processing unit 312 is transmitted from the antenna 313.

The storage unit 320 is a storage device capable of reading and writing data, such as a DRAM, an SRAM, a flash memory, or a hard disk. The storage unit 320 functions as a storage unit of the base station device 300.

The network communication unit 330 is a communication interface for communicating with a node positioned at a high level on the network (for example, the information processing device 260). For example, the network communication unit 330 may be a LAN interface such as an NIC. Additionally or alternatively, the network communication unit 330 may be an S1 interface or an NG interface for connecting to the core network node. The network communication unit 330 may be a wired interface or a wireless interface. The network communication unit 330 functions as a network communication unit of the base station device 300.

The control unit 340 is a controller that controls each unit of the base station device 300. The control unit 340 is realized by, for example, a processor (hardware processor) such as a central processing unit (CPU) or a micro processing unit (MPU). For example, the control unit 340 is realized by a processor executing various programs stored in a storage device inside the base station device 300 using a random access memory (RAM) or the like as a work area. Note that the control unit 340 may be realized by an integrated circuit such as an application specific integrated circuit (ASIC) or a field programmable gate array (FPGA). Any of the CPU, the MPU, the ASIC, and the FPGA can be regarded as a controller.

<2.5. Terminal Device>

Figure 7:
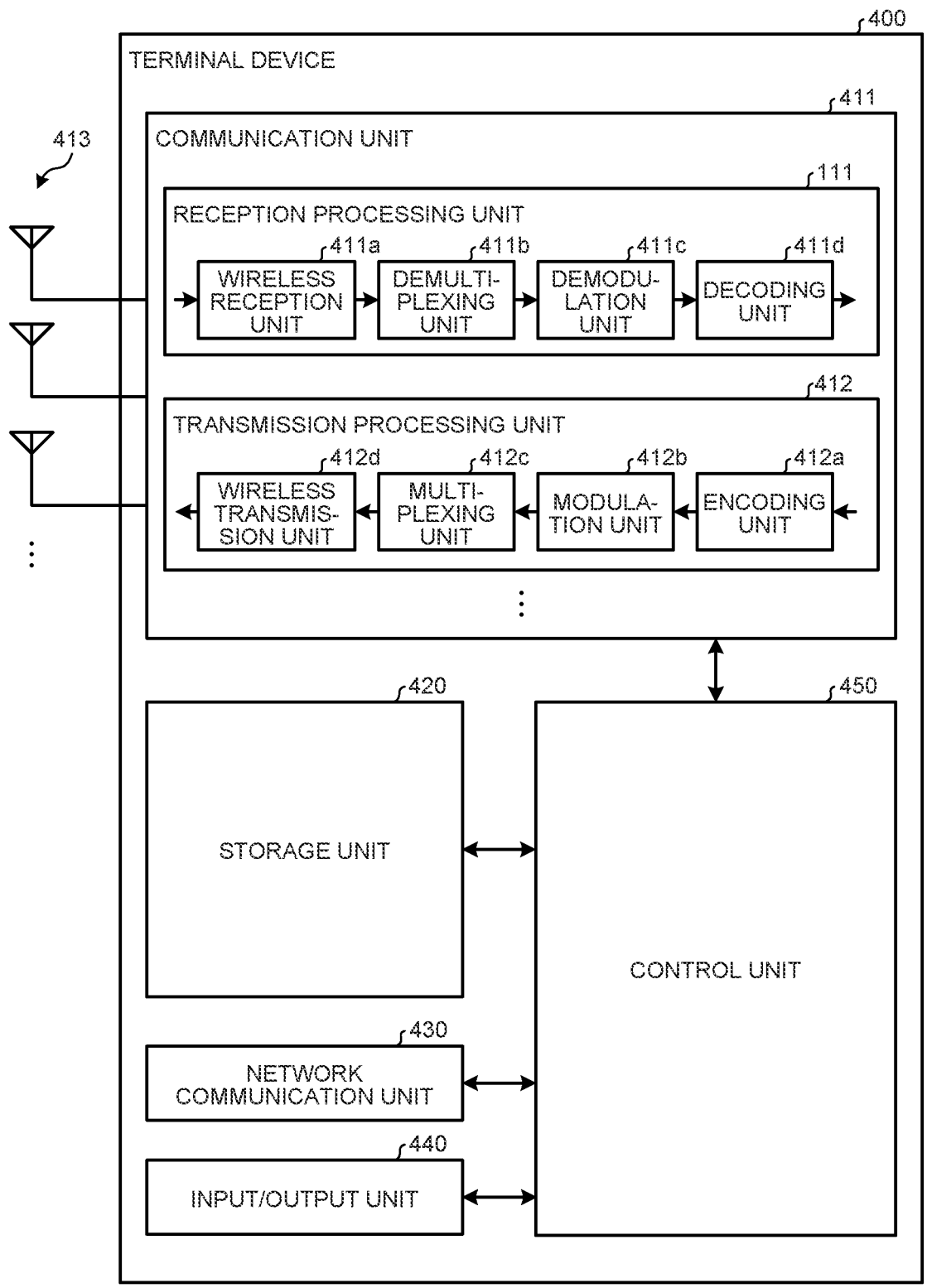
FIG. 7 is a block diagram illustrating a configuration example of a terminal device according to an embodiment of the present disclosure.

Next, a configuration example of the terminal device 400 according to the embodiment of the present disclosure will be described with reference to FIG. 7. FIG. 7 is a block diagram illustrating a configuration example of the terminal device 400 according to the embodiment of the present disclosure.

The terminal device 400 is a wireless communication device that performs wireless communication with the base station device 300. The terminal device 400 is, for example, a mobile phone, a smart device (smartphone or tablet), a personal digital assistant (PDA), or a personal computer. The terminal device 400 may be a head mounted display having a function of wirelessly transmitting and receiving data, VR goggles, or the like.

Furthermore, the terminal device 400 may be capable of sidelink communication with another terminal device 400. The terminal device 400 may be able to use an automatic retransmission technology such as hybrid automatic repeat request (HARQ) when performing sidelink communication. The terminal device 400 may be capable of non-orthogonal multiple access (NOMA) communication with the base station device 300. Note that the terminal device 400 may also be capable of NOMA communication in communication (sidelink) with other terminal devices 400. Furthermore, the terminal device 400 may be capable of low power wide area (LPWA) communication with other communication devices (for example, the base station device 300 and another terminal device 400). In addition, the wireless communication used by the terminal device 400 may be wireless communication using millimeter waves. Note that the wireless communication (sidelink communication) used by the terminal device 400 may be wireless communication using radio waves or wireless communication (optical wireless) using infrared rays or visible light.

The terminal device 400 may be simultaneously connected to a plurality of base station devices or a plurality of cells to perform communication. For example, when one base station device can provide a plurality of cells, the terminal device 400 may perform carrier aggregation by using one cell as a pCell and using another cell as an sCell. Furthermore, in a case where a plurality of base station devices 300 can respectively provide one or a plurality of cells, the terminal device 400 can implement dual connectivity (DC) by using one or a plurality of cells managed by one base station device (MN (for example, MeNB or MgNB)) as the pCell or the pCell and the sCell(s) and using one or a plurality of cells managed by the other base station device (SN (for example, the SeNB or the SgNB)) as the pCell (PSCell) or the pCell (PSCell) and the sCell(s). The DC may be referred to as a multi connectivity (MC).

Note that, in a case where a communication area is supported via cells of different base station devices 300 (a plurality of cells having different cell identifiers or the same cell identifier), it is possible to bundle the plurality of cells and communicate between the base station device 300 and the terminal device 400 by a carrier aggregation (CA) technology, a dual connectivity (DC) technology, or a multi-connectivity (MC) technology. Alternatively, the terminal device 400 and the plurality of base station devices 300 can communicate with each other by a coordinated transmission and reception (CoMP: Coordinated Multi-Point Transmission and Reception) technology via cells of different base station devices 300.

The terminal device 400 includes a communication unit 410, a storage unit 420, a network communication unit 430, an input/output unit 4400, and a control unit 450. Note that the configuration illustrated in FIG. 7 is a functional configuration, and the hardware configuration may be different from the functional configuration. Furthermore, the functions of the terminal device 400 may be realized in a distributed manner in a plurality of physically separated configurations.

The communication unit 410 is a signal processing unit for wirelessly communicating with another wireless communication device (for example, the base station device 300 and another terminal device 400). The communication unit 410 operates according to the control of the control 115. The communication unit 410 may be a wireless transceiver corresponding to one or a plurality of wireless access methods. For example, the communication unit 41 supports both NR and LTE. The communication unit 410 may support W-CDMA or cdma 2000 in addition to NR or LTE. Furthermore, the communication unit 410 may support communication using NOMA.

The communication unit 410 includes a reception processing unit 411, a transmission processing unit 412, and an antenna 413. The communication unit 410 may include a plurality of reception processing units 411, a plurality of transmission processing units 412, and a plurality of antennas 413. The configurations of the communication unit 410, the reception processing unit 411, the transmission processing unit 412, and the antenna 414 are similar to those of the communication unit 310, the reception processing unit 311, the transmission processing unit 312, and the antenna 314 of the base station device 300.

The storage unit 420 is a storage device capable of reading and writing data, such as a DRAM, an SRAM, a flash memory, or a hard disk. The storage unit 420 functions as a storage unit of the terminal device 400.

The network communication unit 430 is a communication interface for communicating with other devices connected via a network. For example, the network communication unit 430 is a LAN interface such as an NIC. The network communication unit 430 may be a wired interface or a wireless interface. The network communication unit 430 functions as a network communication unit of the terminal device 400. The network communication unit 430 communicates with other devices under the control of the control unit 450.

The input/output unit 440 is a user interface for exchanging information with the user. For example, the input/output unit 440 is an operation device for the user to perform various operations, such as a keyboard, a mouse, an operation key, and a touch panel. Alternatively, the input/output unit 440 is a display device such as a liquid crystal display or an organic electroluminescence (EL) display. The input/output unit 440 may be an acoustic device such as a speaker or a buzzer. The input/output unit 440 may be a lighting device such as a light emitting diode (LED) lamp. The input/output unit 440 functions as an input/output unit (input means, output means, operation means, or notification means) of the terminal device 400.

The control unit 450 is a controller that controls each unit of the terminal device 400. The control unit 450 is realized by, for example, a processor such as a CPU, an MPU, or a GPU. For example, the control unit 450 is realized by a processor executing various programs stored in a storage device inside the terminal device 400 using a RAM or the like as a work area. Note that the control unit 450 may be realized by an integrated circuit such as an ASIC or an FPGA. Any of the CPU, the MPU, the GPU, the ASIC, and the FPGA can be regarded as a controller.

3. First Embodiment

As described above, in a case where the plurality of terminal devices 400 belong to different private networks, data transmitted by the application server 100 reaches each terminal device 400 with different delay amounts. This point will be described with reference to FIG. 8.

Figure 8:
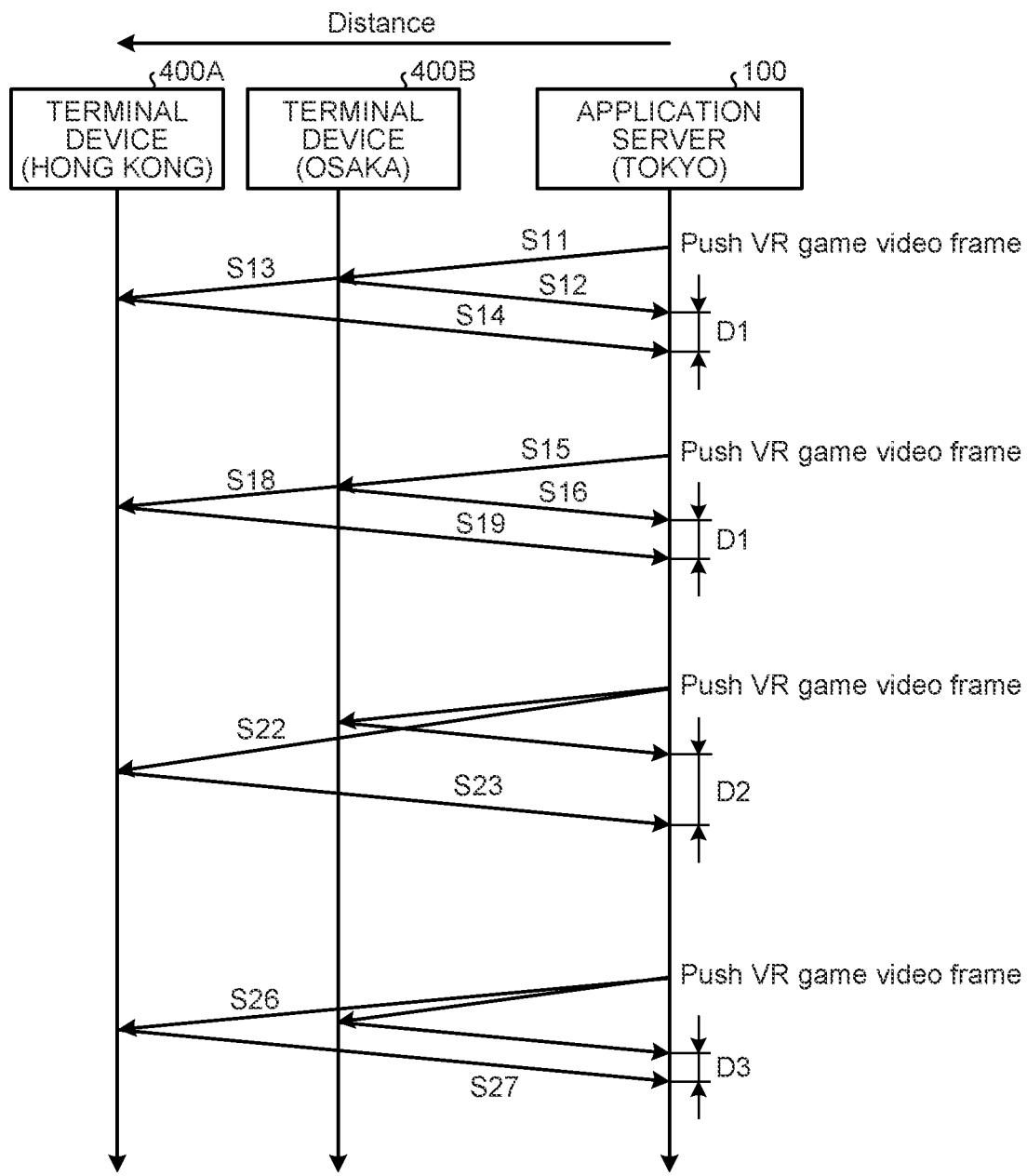
FIG. 8 is a diagram for explaining a delay in the communication system according to a first embodiment of the present disclosure.

FIG. 8 is a diagram for describing a delay in the communication system 1 according to the first embodiment of the present disclosure.

FIG. 8 illustrates a case where the application server 100 installed in Tokyo simultaneously transmits data to the terminal device 400A connected to the private network installed in Hong Kong and the terminal device 400B connected to the private network installed in Osaka. Here, it is assumed that the application server 100 transmits (pushes) video information (VR game video) of the VR game as data at predetermined intervals.

When transmitting the video information, the application server 100 first receives the video information in the terminal device 400B (step S11). This is because the distance between Tokyo where the application server 100 is located and Osaka where the terminal device 400B is located is shorter than the distance between Tokyo and Hong Kong where the terminal device 400A is located.

When receiving the video information, the terminal device 400B transmits response information corresponding to the video information to the application server 100 (step S12). The response information includes, for example, control information such as a command operation of a game.

On the other hand, when receiving the video information later than the terminal device 400B (step S13), the terminal device 400A transmits response information corresponding to the video information to the application server 100 (step S14). In the example of FIG. 8, the response information transmitted by the terminal device 400A reaches the application server 100 delayed by D1 from the response information transmitted by the terminal device 400B.

As described above, the delay amount of the communication delay existing between the terminal devices 400 belonging to different private networks and the application server 100 is different for each private network.

Here, as illustrated in steps S15 to S18 in FIG. 8, it is assumed that the delay amount between the application server 100 and the terminal device 400A and the delay amount between the application server 100 and the terminal device 400B are constant. Note that the processing in steps S15 to S18 is the same as the processing in steps S11 to S14, and thus description thereof is omitted.

As described above, in a case where the delay amount of the terminal device 400A and the delay amount of the terminal device 400B are constant, the delay difference of the response information received by the application server 100 is also constant D1. In a case where the delay difference between the plurality of terminal devices 400A is constant, the application server 100 can reduce the influence of the delay with the terminal device 400 by considering the delay difference.

For example, it is assumed that the application server 100 determines which of the terminal devices 400A and 400B has performed the command operation first. In this case, the application server 100 performs the determination by adding the delay difference D1 to the reception timing of the response information from the terminal device 400B in advance. As a result, even when the delay amount of the terminal device 400 is different, the application server 100 can correctly determine which of the terminal devices 400A and 400B has performed the command operation first.

As described above, when the signal delay amount between the terminal device 400 and the application server 100 is constant, the application server 100 can reduce the influence of the delay. As a result, the application server 100 can ensure the fairness of the service provided to the terminal device 400. For example, even in a game in which one of the terminal devices 400A and 400B tries to take the flag first, the terminal devices 400A and 400B connected to different private networks can simultaneously play the game.

However, if the delay amount of the terminal device 400A and the delay amount of the terminal device 400B fluctuate, it becomes difficult for the application server 100 to correct the delay amount.

For example, as illustrated in FIG. 8, when the delay amount when the terminal device 400A receives data is larger than steps S13 and S18 (step S22), the timing at which the application server 100 receives a response from the terminal device 400A is delayed (step S23). As a result, the delay difference between the terminal devices 400A and 400B becomes D2 larger than D1.

In addition, when the delay amount in a case where the terminal device 400A receives data is smaller than those in steps S13 and S18 (step S26), the timing at which the application server 100 receives a response from the terminal device 400A is advanced (step S27). As a result, the delay difference between the terminal devices 400A and 400B becomes D3 smaller than D1.

In this way, when the delay amount fluctuates, the correction amount (delay difference) becomes not constant, and thus, it becomes difficult to perform correction by the application server 100. For example, even though the terminal devices 400A and 400B simultaneously perform the command operation, the application server 100 erroneously determines that one of the terminal devices 400A and 400B has operated early, and there is a possibility that the fairness of the service cannot be secured.

Such fluctuation occurs due to various factors. One of the factors is, for example, waiting in a switch buffer in the network of the communication system 1 including the private network. A lot of traffic flows through the network, and a lot of packets (data) may stagnate in the buffer of the switch. A change in the amount of stagnant packets can be one of factors that fluctuate the delay amount.

In this case, for example, by providing a priority to a packet by quality of service (QoS) control and preferentially sending a packet with a high priority to the output of the switch, it is possible to reduce a delay of the packet and suppress fluctuation in the delay.

Figure 9:
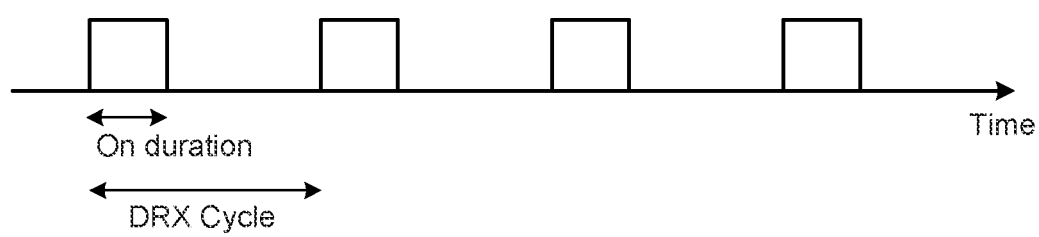
FIG. 9 is a diagram for describing an overview of DRX.

Another factor that causes delay fluctuation is discontinuous reception (DRX) operation. Here, an overview of DRX will be described with reference to FIG. 9. FIG. 9 is a diagram for describing an overview of DRX. DRX is intermittent reception performed to suppress power consumption of the terminal device 400 in a radio access network (RAN).

As illustrated in FIG. 9, the terminal device 400 that performs DRX performs the reception operation in the On-duration period, and does not perform the reception operation in other periods. The terminal device 400 performs intermittent reception by repeatedly performing this in the DRX cycle. The terminal device 400 can suppress the power consumption by cutting off the power of the reception unit for a period other than the On-duration.

DRX is disclosed in Rel 15 TS 36.321 Section 5.7 (LTE), Rel 15 TS 38.321 Section 5.7 (NR). DRX operates similarly in LTE and NR. In a case where DRX is not performed, the terminal device 400 basically monitors PDCCH which is a control signal in all subframes. In a case where the presence of the PDSCH addressed to the terminal device 400 itself is indicated in the PDCCH, the terminal device 400 receives the PDSCH indicated in the PDCCH. Receiving the PDCCH in a case where there is no PDSCH addressed to the own device leads to an increase in power consumption of the terminal device 400. In addition, in a case where the receiving operation is performed, the terminal device 400 periodically reports the measurement result of the channel and the like to the base station device 300 in the uplink. Therefore, when the terminal device 400 that does not transmit and receive data performs a reception operation, a processing load and power consumption increase for the base station device 300 in addition to the terminal device 400.

Therefore, in the NR and the LTE, there is a mechanism in which the terminal device 400 performs intermittent reception in the RRC connected state. In the intermittent reception (DRX), an interval (On-duration) in which the terminal device 400 monitors the PDCCH in a constant cycle (DRX cycle) is provided, and the terminal device 400 does not need to monitor the PDCCH in the other periods.

Although the DRX is performed in both the RRC Idle and the RRC Connected, the DRX (CDRX: Connected DRX) at the time of the RRC Connected described above is related to a factor of fluctuation in the delay amount when the terminal device 400 receives a service from the application server 100.

CDRX has various parameters, and the terminal device 400 performs various intermittent receptions according to a combination of the parameters. Here, in order to simplify the description, it is assumed that the terminal device 400 performs the most basic intermittent reception.

CDRX includes long DRX and short DRX. In the long DRX, the terminal device 400 receives the PDCCH in an On-duration period as illustrated in FIG. 9. In the short DRX, the terminal device 400 receives the PDCCH in a period of short drx on time (not illustrated).

In a case where it is found that there is a PDSCH (user data) addressed to the terminal device 400 itself by the PDCCH received in On-duration or Short drx on time, the terminal device 400 receives the PDSCH subsequent to the PDCCH.

The terminal device 400 receives the PDCCH in the On-duration or the short drx on time at the cycle of the DRX cycle or the short drx period. Therefore, the terminal device 400 receives the PDCCH at the cycle of the DRX cycle or the short drx period.

The determination of long DRX and short DRX, the reception period (On-duration or short drx on time), and the cycle (DRX cycle or short drx period) are determined by the base station device 300 and notified to the terminal device 400. As a result, the terminal device 400 can perform intermittent reception in a predetermined period and cycle.

In the following description, long DRX will be described unless otherwise specified, but the same applies to short DRX.

Next, delay fluctuation caused by CDRX will be described with reference to FIGS. 10A, 10B, 11A, and 11B. FIGS. 10A, 10B, 11A, and 11B are diagrams for explaining fluctuations in delay caused by CDRX.

Figure 10A:
FIGS. 10A and 10B are diagrams for explaining fluctuations in delay caused by CDRX.

FIG. 10A illustrates a transmission timing of data (for example, AR/VR video) transmitted by the application server 100. Here, it is assumed that the application server 100 transmits data at the cycle of the period T1. Note that, for example, in a case where the application server 100 updates the game screen by 60 frames per second, T1=1 second/60=16.6 ms.

Figure 10B:
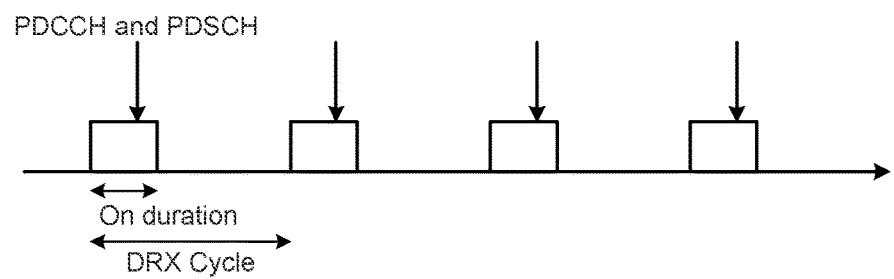

FIG. 10B illustrates an intermittent reception timing of the terminal device 400 and a PDCCH reception timing. Here, it is assumed that the DRX cycle of the terminal device 400 is, for example, the same as the cycle T1 at which the application server 100 transmits data (DRX cycle=T1=16.6 ms).

In this case, the terminal device 400 can receive the PDCCH indicating that there is data addressed to its own device and the PDSCH including the data addressed to its own device in the On-duration period. In a case where the length of the On-duration is, for example, 1 ms, the terminal device 400 may enter a mode of not receiving 15.6 ms.

Figure 11A:
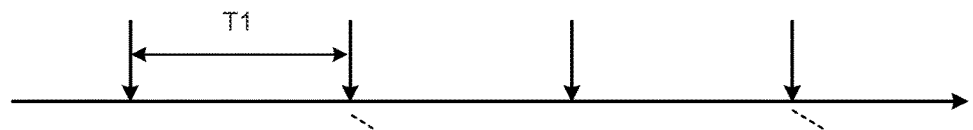
FIGS. 11A and 11B are diagrams for explaining fluctuations in delay caused by CDRX.
Figure 11B:
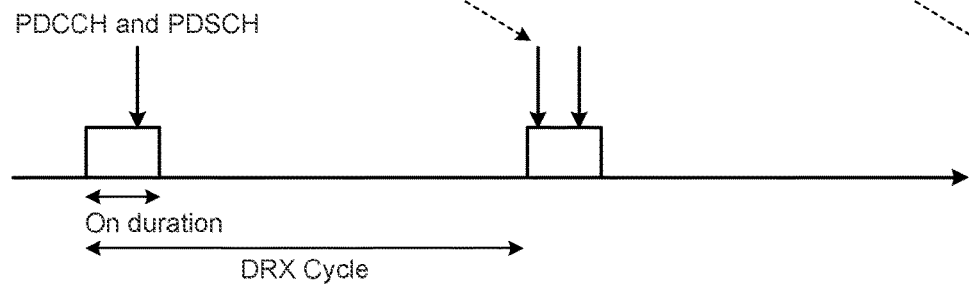

On the other hand, FIGS. 11A and 11B illustrate a case where the DRX cycle of the terminal device 400 is different from the cycle T1 in which the application server 100 transmits data, for example.

FIG. 11A illustrates a transmission timing of data (for example, AR/VR video) transmitted by the application server 100 similarly to FIG. 10A.

FIG. 11B illustrates a case where the DRX cycle of the terminal device 400 is longer than the cycle T1 at which the application server 100 transmits data, for example.

In the example of FIGS. 11A and 11B, after the terminal device 400 receives the PDCCH and the PDSCH in the first On-duration, the application server 100 transmits data until the next On-duration. However, at the time of transmission of this data, the terminal device 400 does not perform a reception operation. Therefore, in the next On-duration period, the terminal device 400 receives two PDCCH and PDSCH, that is, the PDCCH and the PDSCH corresponding to the data transmitted in the non-reception mode and the PDCCH and the PDSCH corresponding to the data transmitted in the On-duration period.

As a result, the reception timings of the PDCCH and the PDSCH received by the terminal device 400 do not become a constant cycle, and appear to fluctuate greatly when viewed from the terminal device 400. Therefore, the timing at which the terminal device 400 returns a response to such data in the uplink also fluctuates. This causes the delay amount between the application server 100 and the terminal device 400 not to be constant and fluctuate.

In particular, the CDRX described above is a setting in one base station device 300. Therefore, conventionally, the CDRX provided by the plurality of base station devices 300 belonging to each of the plurality of private networks is independently set for each base station device 300. In addition, the setting value of the conventional CDRX is closed in the base station device 300 and is not disclosed by the API. For example, there is no API for controlling a setting value of CDRX in an API of a conventional core network.

Therefore, in the communication system 1 according to the first embodiment of the present disclosure, the cycle of CDRX is made to coincide with the cycle T1 at which the application server 100 transmits (pushes) data among the plurality of terminal devices 400 that simultaneously receive the provision of the service from the application server 100. For example, among the plurality of terminal devices 400 participating in the same game, the cycle of pushing the AR/VR video image of the game and the cycle of CDRX are made to coincide with each other.

Note that the terminal device 400 may simultaneously perform a plurality of communications in addition to the service provided by the application server 100 (hereinafter, also simply referred to as a provided service, for example, a game). For example, in addition to the game), a plurality of communications may be simultaneously performed. Therefore, the base station device 300 cannot determine the CDRX cycle only to receive the data of the provided service, but it can be considered that it is possible in implementation to set the DRX cycle of an appropriate value according to the timing of the data that the base station device 300 arrives from the application server 100. However, in order for the base station device 300 to be able to set an appropriate DRX cycle, a certain amount of learning time is required. Therefore, it can be considered that an appropriate DRX cycle cannot be set depending on implementation in many cases.

Therefore, in the first embodiment of the present disclosure, the AF 429 performs a CDRX setting process of notifying the base station device 300 of the CDRX setting including the appropriate DRX cycle for service provision on the basis of the information from the application server 100. As a result, the base station device 300 can set an appropriate CDRX for the terminal device 400 that receives the provision of the service.

Furthermore, in the first embodiment of the present disclosure, for example, the AF 249 sets CDRX using the API of the AMF 241. As a result, the CDRX can be set by the NF or the AF 249 in the private network.

Figure 12:
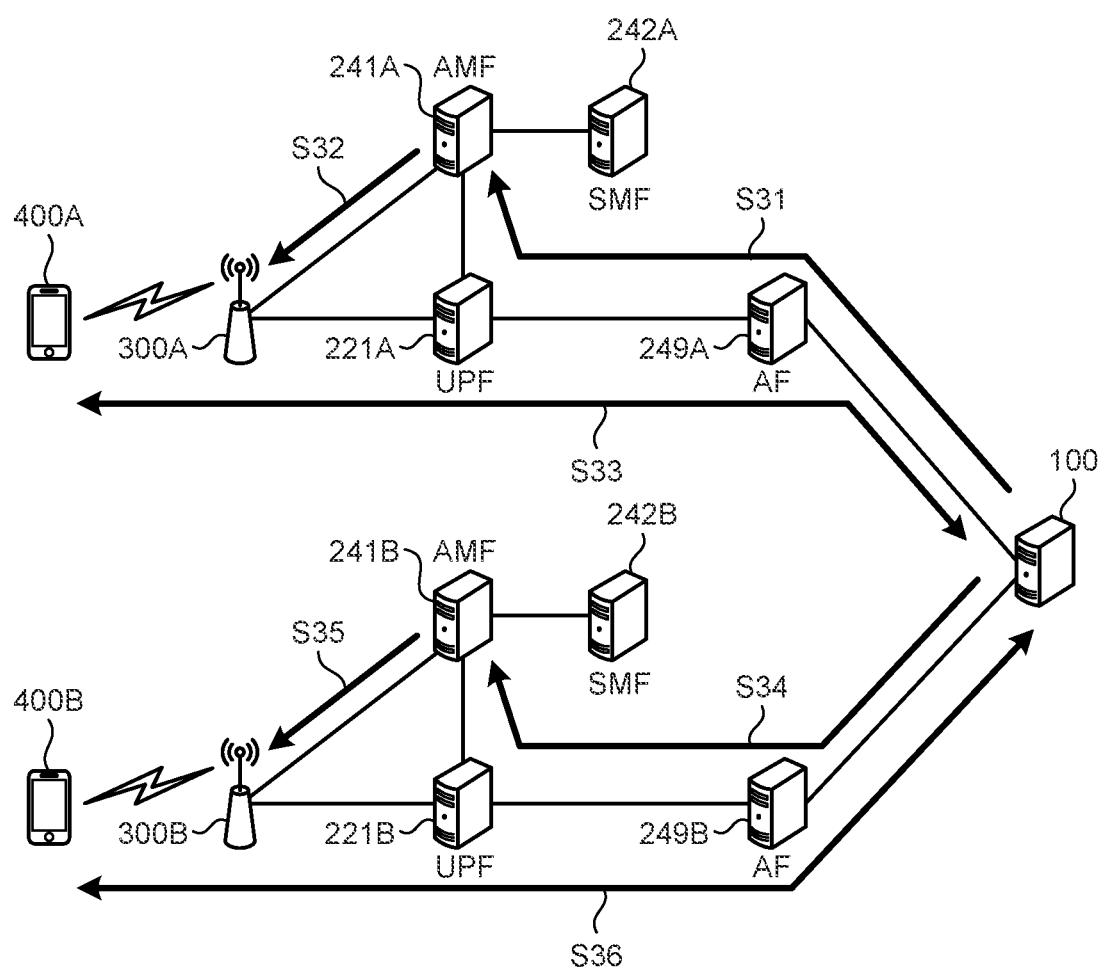
FIG. 12 is a diagram for explaining an example of a CDRX setting process executed in the communication system according to the first embodiment of the present disclosure.

The CDRX setting process will be described with reference to FIG. 12. FIG. 12 is a diagram for describing an example of a CDRX setting process executed in the communication system 1 according to the first embodiment of the present disclosure.

As illustrated in FIG. 12, the application server 100 requests, via an AF 249A, an AMF 241A to set the CDRX using the API of the AMF 241 (step S31). The AMF 241A transmits the received request to the base station device 300A (step S32).

When the CDRX is set by the base station device 300A, the application server 100 transmits and receives data to and from the terminal device 400A via the UPF 221A (step S33).

Similarly, the application server 100 requests an AMF 241B via an AF 249B to set the CDRX using the API (step S34). The AMF 241B transmits the received request to the base station device 300B (step S35).

When the CDRX is set by the base station device 300B, the application server 100 transmits and receives data synchronized with the terminal device 400B and the terminal device 400A via the UPF 221B (step S36).

As described above, the application server 100 notifies the base station device 300 of the CDRX setting via the AF 249 and the AMF 241, so that the CDRX corresponding to the data transmission timing can be set to the terminal device 400. As a result, the application server 100 can transmit data to the plurality of terminal devices 400A and 400B in synchronization.

Note that, here, the application server 100 requests the CDRX setting, but the present invention is not limited thereto. The AF 249 may request CDRX setting instead of the application server 100.

In this case, the AF 249 receives information from the application server 100 and requests CDRX setting on the basis of the information. This information includes, for example, information specifying the terminal device 400 that synchronizes the data transmission cycle with the CDRX cycle, information regarding the data transmission cycle (for example, a frame rate), and the like. When receiving the information, the AF 249 notifies the CDRX setting set in advance according to the information using the API of the AMF 241.

The AF 249 may have a function of pushing data from the application server 100 in addition to the CDRX setting. In other words, the AF 249 may be a Push Notification Server.

Generally, the push notification server is provided outside a virtual private network (VPN) constituting a private network. However, when the push notification server performs CDRX setting as in the present embodiment, the push notification server is desirably disposed in the VPN. This is because the push notification server is desirably disposed in the VPN in order to perform CDRX setting by using the API of the AMF 241.

In this way, when the AF 249 performs the CDRX setting, the application server 100 may be disposed in the VPN or may be disposed outside the VPN. Since the AF 249 performs the CDRX setting, the application server 100 can provide a service to the terminal device 400 without being conscious of the CDRX.

Furthermore, FIG. 12 illustrates a case where the terminal devices 400A and 400B are connected to different private networks, but the present invention is not limited thereto. The terminal devices 400A and 400B may be connected to the same private network. In this case, the terminal devices 400A and 400B may belong to the same base station device 300, or may belong to different base station devices 300.

Furthermore, FIG. 12 illustrates a case where an API for accepting a request for CDRX setting is newly provided in the AMF 241, but the present invention is not limited thereto. For example, this API may be provided in the base station device 300. In this case, the AF 249 transmits a request for CDRX setting to the base station device 300 using the API without using the AMF 241.

Figure 13:
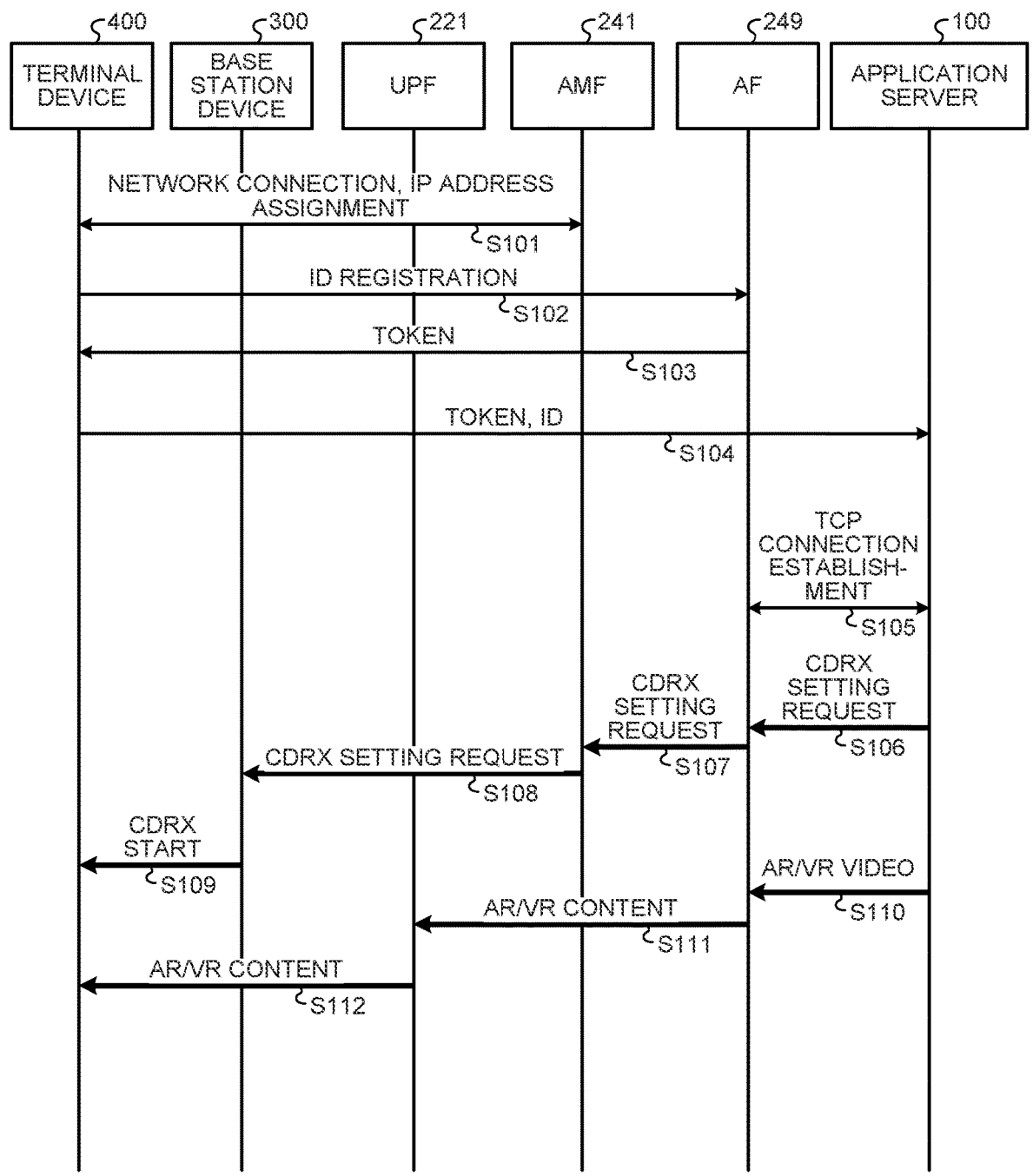
FIG. 13 is a sequence diagram for explaining a flow of a CDRX setting process according to the first embodiment of the present disclosure.

Here, details of the CDRX setting process will be described with reference to FIG. 13. FIG. 13 is a sequence diagram for explaining the flow of the CDRX setting process according to the first embodiment of the present disclosure. FIG. 13 illustrates a case where the CDRX setting is set for one of the plurality of terminal devices 400.

In FIG. 13, first, the terminal device 400 is connected to the wireless network and the core network 200 (step S101). At this time, an IP address is allocated from the SMF 242 (see FIG. 2).

Next, the terminal device 400 registers its own ID in the AF 249 (step S102). At this time, the IMSI of the terminal device 400 is also registered in the AF 249. Next, the AF 249 transmits the token to the terminal device 400 as a response to the registration of the ID (step S103).

Next, the terminal device 400 transmits the token and its own ID to the application server 110 (step S104). The application server 110 registers a token and an ID of the terminal device 400.

The AF 249 establishes a TCP connection with the application server 110 (step S105).

When the TCP connection is established, the application server 100 transmits a CDRX setting request to the AF 249 (step S106). As described above, the AF 249 may notify the AMF 241 of the CDRX setting request instead of the application server 100. In this case, the application server 100 requests the AF 249 to transmit the CDRX setting request by notifying the AF 249 of information necessary for the CDRX setting request instead of the CDRX setting request.

The AF 249 notifies the AMF 241 of a CDRX setting request using the API of the AMF 241 (step S107). The AMF 241 that has received the request notifies the base station device 300 of a CDRX setting request (step S108).

The base station device 300 that has received the request sets CDRX in accordance with the CDRX setting request, and causes the terminal device 400 to start CDRX (step S109).

The application server 100 transmits transmission data, for example, AR/VR video, to the AF 249 (step S110). The AF 249 pushes the received transmission data (AR/VR content) to the UPF 221 (step S111). The UPF 221 pushes the transmission data (AR/VR content) to the terminal device 400 (step S112).

Thereafter, the application server 100 similarly pushes the transmission data to the terminal device 400 at a predetermined cycle (for example, the frame rate).

Next, an example of the CDRX setting request process by the AF 249 will be described with reference to FIG. 14. FIG. 14 is a sequence diagram illustrating an example of a flow of the CDRX setting request process according to an embodiment of the present disclosure.

The AF 249 notifies the AMF 241 of a request for CDRX setting including the ID of the terminal device 400 (step S201). Examples of the ID of the terminal device 400 include IMSI( ) and SUPI.

Upon receiving the CDRX setting request, the AMF 241 responds with an acknowledge to the AF 249 (step S202).

As described above, the AF 249 sets the CDRX in response to the request from the application server 100, so that fluctuation in the delay of the data (packet) transmitted from the application server 100 to the terminal device 400 can be reduced.

4. Second Embodiment

In the CDRX setting process of the first embodiment, even if the cycle T1 of the data transmitted by the application server 100 is matched with the period of the CDRX set by the base station device 300, delay fluctuation may occur. A method for suppressing fluctuation occurring in this case will be described as a second embodiment. First, delay fluctuation occurring in this case will be described with reference to FIGS. 15A and 15B. FIGS. 15A and 15B are diagrams for explaining fluctuations in delay according to the second embodiment of the present disclosure.

FIG. 15A illustrates a timing at which the video data transmitted from the application server 100 arrives at the base station device 300.

The application server 100 transmits, for example, video data at a predetermined cycle T1, but there is a case where a slight delay fluctuation occurs in the video data reaching the base station device 300 due to the influence of the above-described switch buffer or the like. For example, as illustrated in FIG. 15A, there is a case where it takes a period T2 longer than the cycle T1 after the video data arrives at the base station device 300 until the next video data arrives.

Although the fluctuation in the delay due to the switch buffer or the like is slight, the fluctuation in the delay may become large depending on the data reception timing by the terminal device 400.

For example, as illustrated in FIG. 15B, there is a case where video data transmitted by the base station device 300 is received near the end of the On-duration period. In this case, the timing at which the terminal device 400 receives the video data may deviate to the next On-duration period due to the fluctuation in the arrival timing of the video data. Note that FIG. 15B illustrates the CDRX timing and the reception timings of the PDCCH and the PDSCH by the terminal device 400.

As described above, the fluctuation in the delay may become large depending on the timing at which the terminal device 400 performs the intermittent reception and the timing at which the base station device 300 transmits the video data to the terminal device 400 (in other words, timing at which the video data reaches the base station device 300). More specifically, when the terminal device 400 receives the video data in the last period of the reception period (On-duration), the fluctuation in the delay may increase due to the fluctuation in the arrival timing.

Therefore, as illustrated in FIGS. 16A and 16B, in the communication system 1 according to the second embodiment of the present disclosure, the terminal device 400 receives the video data during a period other than the end period of the On-duration, in other words, before the predetermined period. For example, if the terminal device 400 receives the video data around the center of the On-duration, the terminal device 400 can receive the video data during the On-duration even if the arrival timing fluctuates.

Note that FIGS. 16A and 16B are diagrams for explaining a reception timing of video data by the terminal device 400 according to the second embodiment of the present disclosure. FIG. 16A illustrates the timing at which the video data transmitted by the application server 100 arrives at the base station device 300, and FIG. 16B illustrates the CDRX timing and the reception timing of the PDCCH and the PDSCH by the terminal device 400.

As described above, as a method in which the terminal device 400 receives the video data before the predetermined period of the On-duration, a method of adjusting the setting of the CDRX by implementation according to the video data in which the base station device 300 arrives is considered.

However, not only video data but also data of other traffic arrives at the base station device 300. In the method of adjusting the CDRX setting by implementation as described above, it is necessary to determine whether or not the data at which the base station device 300 arrives is the video data from the application server 100, and it is considered to be difficult to realize the method.

Therefore, in the communication system 1 according to the second embodiment of the present disclosure, the base station device 300 notifies the AF 249 of the relationship between the reception period (On-duration) in the CDRX and the data arrival timing in response to a request from the AF 249, for example.

FIGS. 17A and 17B are diagrams for describing an arrival timing of data notified by the base station device 300 according to the second embodiment of the present disclosure.

FIG. 17A illustrates a timing at which data transmitted by the base station device 300 arrives at the terminal device 400. FIG. 17B illustrates CDRX of the terminal device 400. Note that FIG. 17B illustrates a case where the DRX cycle of the terminal device 400 is 3 times the On-duration.

As illustrated in FIGS. 17A and 17B, the base station device 300 sets the head of the DRX cycle to 0%, sets the head of the next DRX cycle to 300%, and notifies the AMF 241 of the arrival timing at which the data arrives at which position of 299% of the end of the DRX cycle from 0%. In the case of FIGS. 17A and 17B, a range from 0% to 100% indicates that the data has reached within the On-duration period. Further, a range from 101% to 299% indicates that the data reaches the outside of the On-duration period, in other words, does not reach the inside of the On-duration period.

The base station device 300 calculates at what percentage position the data arrives at the terminal device 400 on the basis of the data arrival timing and the CDRX setting of the terminal device 400, and notifies the AMF 241 of the calculation result.

In order for the base station device 300 to transmit this notification to the AMF 241, the base station device 300 needs to specify data for determining the arrival timing. The base station device 300 cannot specify data with an IP address or the like, but can specify data with an ID of a GTP-tunnel.

Therefore, the AMF 241 designates the GTP-tunnel ID and requests the base station device 300 to notify the data arrival timing. More specifically, the AF 249 requests the AMF 241 to notify the data arrival timing by specifying a destination IP address (Destination IP Address) of the data and a source IP address (Source IP Address) of the data. The destination IP address is, for example, an IP address of the terminal device 400. The source IP address is, for example, the IP address of the AF 249. The AMF 241 specifies the IDs of the GTP-tunnels corresponding to these IP addresses, and requests the base station device 300 to notify the data arrival timing including the IDs of the GTP-tunnels.

The base station device 300 reports the arrival timing of the data arriving with the ID of the designated GTP-tunnel to the AMF 241.

Figure 18:
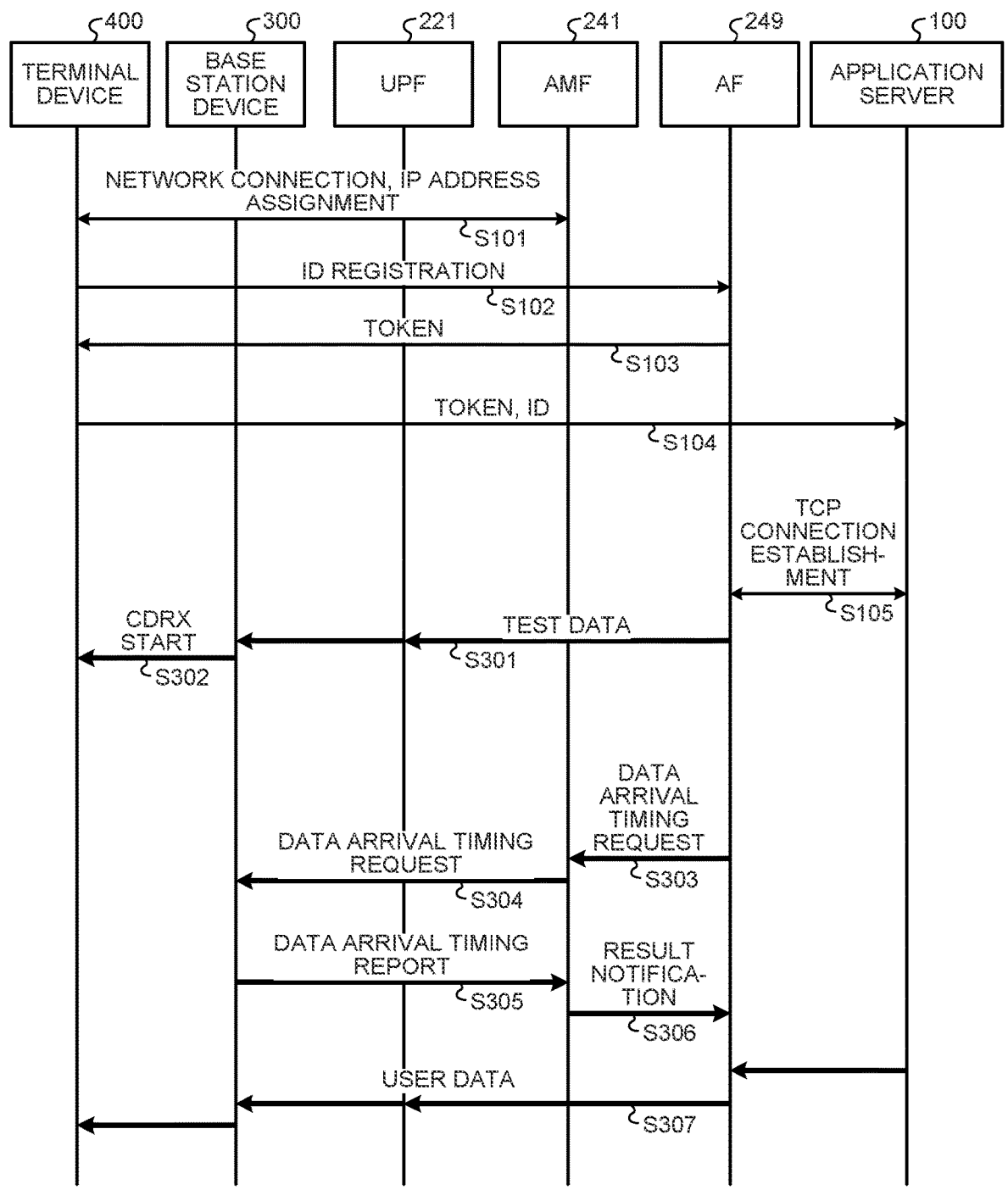
FIG. 18 is a sequence diagram for describing an example of a flow of an arrival timing notification process according to a second embodiment of the present disclosure.

FIG. 18 is a sequence diagram for describing an example of a flow of an arrival timing notification process according to the second embodiment of the present disclosure. Note that the same reference numerals are applied to the same processes as those in the sequence diagram of FIG. 13, and the description thereof will be omitted.

In step S105, the AF 249 establishing the TCP connection with the application server 100 transmits test data for measuring the data arrival timing to the base station device 300 via the UPF 221 (step S301).

Furthermore, the base station device 300 instructs the terminal device 400 to start CDRX (step S302).

After transmitting the test data, the AF 249 transmits a data arrival timing request including the IP address of the terminal device 400 as a destination and the IP address of the own device as a transmission source to the AMF 241 (step S303).

Upon receiving the data arrival timing request, the AMF 241 specifies the ID of the GTP-tunnel from the IP address included in the request, and transmits the data arrival timing request including the specified ID of the GTP-tunnel to the base station device 300 (step S304).

The base station device 300 transmits a data arrival timing report including a position (percentage) at which the test data arrives in the DRX cycle to the AMF 241 on the basis of the CDRX setting and the arrival timing of the test data (step S305). The AMF 241 notifies the AF 249 of the measurement result of the data arrival timing based on the data arrival timing report (step S306).

On the basis of the measurement result, the AF 249 adjusts the arrival timing of the user data (for example, AR/VR video data) received from the application server 100 to reach the terminal device 400 at the desired position (for example, a period before a predetermined period) of the On-duration. The AF 249 transmits the user data to the terminal device 400 via the UPF 221 and the base station device 300 at the adjusted timing (step S307).

Note that the AF 249 desirably adjusts the transmission timing such that the user data reaches between 10% and 50% of the DRX cycle, for example (see FIGS. 17A and 17B). By the AF 249 adjusting the transmission timing in this manner, even if fluctuation occurs in the arrival timing of the user data, the terminal device 400 can receive the user data in a desired On-duration period, and fluctuation in the delay can be further suppressed.

The transmission timing is adjusted once for a group of periodically transmitted packets (user data). In other words, the notification process illustrated in FIG. 18 is executed before the user data is transmitted from the application server 100.

Therefore, in FIG. 18, the CDRX setting is not changed between at the time of transmission of the test data and at the time of transmission of the user data, and the same setting is maintained. Alternatively, the transmission timing illustrated in FIG. 18 is adjusted each time the CDRX setting is changed.

Here, although the AF 249 adjusts the transmission timing of the user data, the present invention is not limited thereto.

The base station device 300 may adjust the CDRX setting so that the user data arrives at the terminal device 400 at a desired timing.

Figure 19:
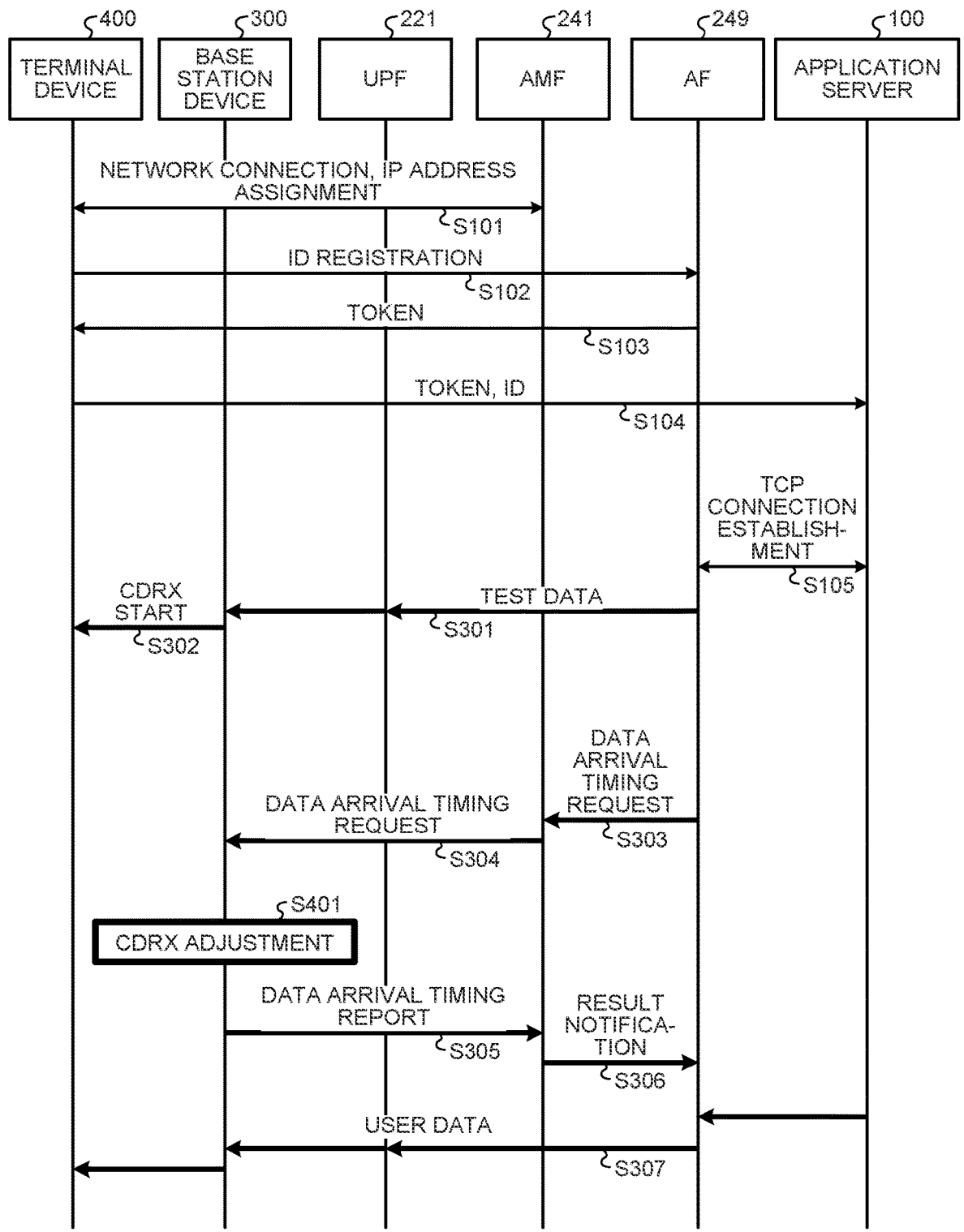
FIG. 19 is a sequence diagram for explaining another example of the flow of the arrival timing notification process according to the second embodiment of the present disclosure.

FIG. 19 is a sequence diagram for describing another example of the flow of the arrival timing notification process according to the second embodiment of the present disclosure. Note that the same reference numerals are applied to the same processes as those in the sequence diagram of FIG. 18, and the description thereof will be omitted.

In step S304, the base station device 300 that has received the data arrival timing request adjusts the CDRX setting according to the timing at which the test data arrives (step S401).

The base station device 300 that has completed the adjustment notifies the AMF 241 of ACK indicating the completion (step S402). Upon receiving the ACK, the AMF 241 notifies the AF 249 of the ACK indicating that the adjustment of the CDRX setting has been completed (step S403).

Thereafter, the AF 249 transmits the user data (for example, AR/VR video data) received from the application server 100 to the terminal device 400 via the UPF 221 and the base station device 300 (step S404).

As described above, even when the base station device 300 adjusts the CDRX setting, fluctuation in the delay can be further suppressed.

Note that adjustment of the CDRX setting is performed once for a group of periodically transmitted packets (user data). In other words, the notification process illustrated in FIG. 19 is executed before the user data is transmitted from the application server 100.

Therefore, in FIG. 19, it is assumed that the test data and the user data are transmitted while maintaining the same cycle. Alternatively, the CDRX setting is adjusted each time the data transmission cycle is changed. In addition, it is assumed that the test data is periodically transmitted a plurality of times.

Conventionally, in the AF 249, means for acquiring information regarding the CDRX setting of the base station device 300 is not clearly defined, and it is difficult for the AF 249 to know at which timing of the CDRX data arrives.

Therefore, in the second embodiment of the present disclosure, the AF 249 can request the base station device 300 to report the relationship between the CDRX setting and the data arrival timing via the API of the core network 200. As a result, the application side can more accurately adjust the delay between the plurality of terminal devices 400.

In addition, conventionally, since it is difficult for the base station device 300 to determine the data transmitted from the AF 249 using the IP address, it is difficult for the base station device 300 to know at which timing the data arrives from the AF 249.

Therefore, in the second embodiment of the present disclosure, the AMF 241 enables the base station device 300 to specify the data to be transmitted by the AF 249 using the GTP-tunnel ID. As a result, the base station device 300 can know the arrival timing of the data transmitted from the AF 249, and can adjust the CDRX setting in accordance with the arrival timing. Therefore, fluctuation in the delay of the terminal device 400 can be further suppressed.

5. Third Embodiment

In the CDRX setting process of the first embodiment, the CDRX settings (cycle) can be made uniform among the plurality of terminal devices 400, but the timing at which the plurality of terminal devices 400 starts CDRX has not been considered. Therefore, there has been a possibility that the timing of starting CDRX is shifted among the plurality of terminal devices 400.

Figure 20:
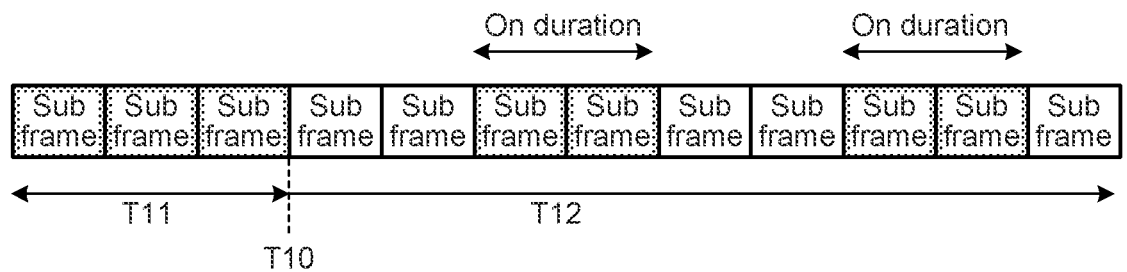
FIG. 20 is a diagram for explaining a start timing of CDRX.

Here, the timing of starting CDRX will be described with reference to FIG. 20. FIG. 20 is a diagram for explaining the start timing of CDRX.

In a period T11 illustrated in FIG. 20, the terminal device 400 monitors the PDCCH in units of subframes. In a case where there is no transmission/reception data addressed to the terminal device 400 itself for a certain period (a certain number of subframes), the terminal device 400 starts CDRX.

More specifically, the terminal device 400 monitors the PDCCH of the subframe, starts the drx-Inactivity Timer from the timing at which the PDSCH addressed to its own device does not exist, and measures a period (the number of subframes) in which the PDSCH addressed to its own device does not exist. Alternatively, the terminal device 400 may monitor the PDCCH of the subframe and start the measurement after the PDSCH is no longer scheduled. When the measurement period exceeds the predetermined period, the terminal device 400 shifts to the intermittent reception mode and starts CDRX.

In the example of FIG. 20, in a case where the PDSCH addressed to the terminal device 400 does not exist in the three subframes monitored in the period T11, the terminal device 400 performs CDRX in the next period T12. In FIG. 20, the terminal device 400 alternately repeats the reception of the PDCCH and the reception stop every two subframes, receives the PDCCH in the On-duration period, and checks whether there is a PDSCH addressed to the terminal device 400 itself.

Here, the terminal device 400 executes a plurality of applications. Therefore, a plurality of sessions are established between the terminal device 400 and the core network 200, and traffic may occur between the terminal device 400 and devices other than the application server 100.

Therefore, a plurality of terminal devices 400 that receives provision of the same service from the same application server 100 does not necessarily start CDRX at the same timing. For example, the terminal device 400 that has received data from a device other than the application server 100 in the period T11 in FIG. 20 does not start CDRX from the period T12. As described above, in the conventional communication system, it is difficult to align the CDRX start timing with the plurality of terminal devices 400.

When the start timing of CDRX is different, for example, there may be a state in which one terminal device 400 performs CDRX while the other terminal device 400 does not perform CDRX. In this case, there is a possibility that the variation in the packet reception timing is different between the terminal device 400 that is performing CDRX and the terminal device 400 that is not performing CDRX.

For example, in the terminal device 400 that continuously receives the PDCCH and the PDSCH without performing the CDRX, the variation in the packet reception timing is small. On the other hand, the terminal device 400 that performs CDRX and performs intermittent reception has a large variation in packet reception timing.

As described above, by setting the CDRX cycle, it is possible to align the CDRX cycles of the plurality of terminal devices 400. However, when the timing of starting CDRX is different among the plurality of terminal devices 400, the degree of fluctuation in the delay may be greatly different between the terminal device 400 that has started CDRX first and the terminal device 400 that has started CDRX later.

For example, in FIG. 20, even if there is a packet addressed to the terminal device 400 itself at time T10, the terminal device 400 that has started CDRX at the time T10 cannot receive the packet until the next On-duration. On the other hand, the terminal device 400 that has not started CDRX at the time T10 can receive a packet addressed to the terminal device 400 itself in a subframe next to the time T10.

As described above, when the timings to start CDRX are different, there is a possibility that the timings at which the plurality of terminal devices 400 receives packets are different from each other even if the CDRX cycles are the same, and there is a possibility that the influence of the fluctuation in the delay becomes large.

As described above, in a case where the terminal device 400 executes a plurality of applications, an application (an application provided by the application server 100) affected by the fluctuation in the delay and other applications are separated. By separating the applications, CDRX start timings of a plurality of terminal devices 400 that receive data from a specific application are aligned.

For example, in 4G or 5G LTE, one terminal device 400 can use a plurality of component carriers (CCs). In addition, in 5G, a plurality of band width parts (BWPs) can be used in one component carrier. Therefore, the terminal device 400 uses different CCs or BWPs for each application.

As a result, the CDRX of a specific CC or BWP can be started on the basis of an instruction from the base station device 300 instead of being started in accordance with the actual traffic generation timing. That is, the base station device 300 determines the CC or BPW to be used for communication with the application server 100, and performs the CDRX setting including the start or end timing of the CDRX in the CC or BPW. Note that the CDRX setting is performed, for example, on the basis of an instruction from the application server 100 or the AF 249. The application server 100 or the AF 249 instructs the base station device 300 via the AMF 241 using the API.

For example, at the start of service provision, the AF 249 or the application server 100 requests the base station device 300 to start CDRX so that CDRX is started at the same timing for a plurality of terminal devices 400 that simultaneously receive the service. This request is made to each of the plurality of core networks 200 to which the plurality of terminal devices 400 is connected.

More specifically, a new API is provided in the AMF 241 of the core network 200, and the AF 249 requests CDRX initiation using this API.

Note that, here, it is assumed that the plurality of core networks 200 to which the plurality of terminal devices 400 is connected are in frame synchronization with each other. That is, it is assumed that not only a plurality of base station devices 300 belonging to the same private network is in frame synchronization, but also base station devices 300 belonging to different private networks are in frame synchronization.

In a cellular network, the frame is usually composed of 10 ms frames. A number called system frame number is assigned to this frame. The system frame number is 1024 at the maximum, and a system frame number of 1 is allocated to the next frame of the frame having the system frame number of 1024.

In a case where frame synchronization is achieved, the plurality of base station devices 300 performs communication using frames to which the same system frame number is assigned at the same timing. Therefore, if frame synchronization is achieved between the plurality of base stations, the AF 249 designates which subframe the CDRX starts from, whereby the plurality of base station devices 300 can set the CDRX so as to start the CDRX at the same timing.

In general, frame synchronization is not performed between the base station devices 300 belonging to different private networks, but by using an existing technology, frame synchronization can be performed between the base station devices 300 belonging to different private networks due to implementation.

Figure 21:
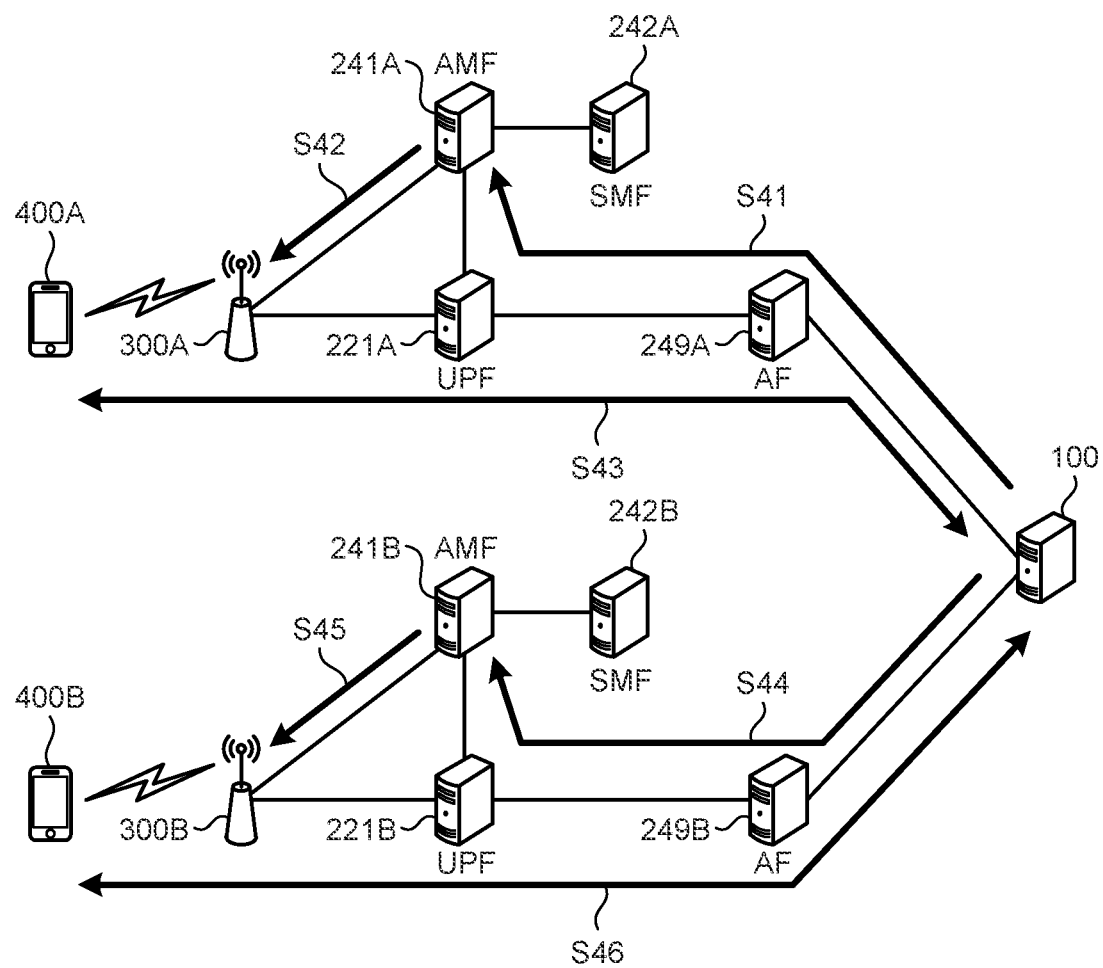
FIG. 21 is a diagram for explaining an example of a flow of a CDRX synchronization process according to a third embodiment of the present disclosure.
Figure 22:
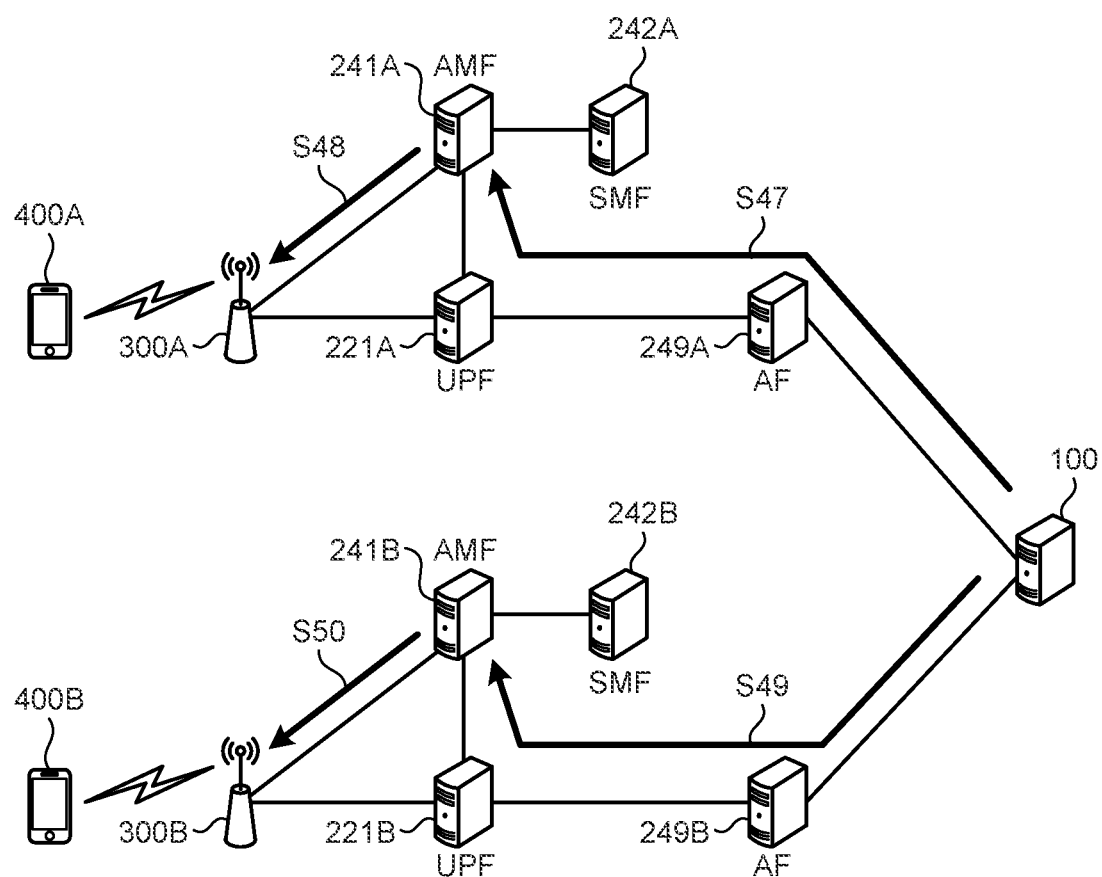
FIG. 22 is a diagram for explaining an example of a flow of the CDRX synchronization process according to the third embodiment of the present disclosure.

An example of a process (hereinafter, it is also referred to as CDRX synchronization process) in which the AF 249 instructs the start timing of CDRX will be described with reference to FIGS. 21 and 22. FIGS. 21 and 22 are diagrams for explaining an example of a flow of a CDRX synchronization process according to the third embodiment of the present disclosure.

As illustrated in FIG. 21, the AF 249A that has received a notification of service provision (for example, a game) start from the application server 100 requests the AMF 241A to start the CDRX using the API (step S41). In addition, for example, the AMF 241A calculates the start timing of CDRX in a predetermined procedure from the game start timing notified by the application server 100, and requests the start of CDRX. The AF 249A may notify the AMF 241A of the CDRX start request in accordance with the start timing of the CDRX, or may notify the CDRX start request including the start timing of the CDRX.

The AMF 241A that has received the CDRX start request notifies the base station device 300A to start CDRX at the CDRX start timing (step S42). Upon receiving the CDRX, the base station device 300A sets the terminal device 400A to start CDRX from the CDRX start timing.

Thereafter, CDRX communication is performed between the application server 100 and the terminal device 400A via the AF 249A, the UPF 221A, and the base station device 300A (step S43).

Similarly, the AF 249B that has received the notification of the start of service provision (for example, a game) from the application server 100 requests the AMF 241B to start CDRX using the API (step S44). In addition, for example, the AMF 241B calculates the start timing of CDRX in a predetermined procedure from the game start timing notified by the application server 100, and requests the start of CDRX. The AF 249B may notify the AMF 241B of the CDRX start request in accordance with the start timing of the CDRX, or may notify the CDRX start request including the start timing of the CDRX.

The AMF 241B that has received the CDRX start request notifies the base station device 300B to start CDRX at the CDRX start timing (step S45). In response to this, the base station device 300B sets the terminal device 400B to start CDRX from the CDRX start timing.

Thereafter, CDRX communication is performed between the application server 100 and the terminal device 400B via the AF 249B, the UPF 221B, and the base station device 300B (step S46).

Frame synchronization is established between the private network to which the base station device 300A belongs and the private network to which the base station device 300B belongs. Therefore, the AFs 249A and 249B can instruct the base station device 300 via the AMF 241 to start CDRX at the same CDRX start timing.

Note that the AF 249 may include the setting regarding the CDRX cycle described above in the CDRX start request. That is, the base station device 300 may be requested via the AMF 241 so that the AF 249 sets both the CDRX start timing and the CDRX cycle.

Next, a case where the timing at which the AF 249 ends the CDRX is set will be described with reference to FIG. 22.

As illustrated in FIG. 22, the AF 249A that has received the notification of the end of the service provision (for example, a game) from the application server 100 requests the AMF 241A to end the CDRX using the API (step S47).

The AMF 241B that has received the CDRX end request notifies the base station device 300B to end the CDRX at the CDRX end timing (step S48). In response to this, the base station device 300A sets the terminal device 400B to end the CDRX at the CDRX end timing.

Similarly, the AF 249B that has received the notification of the end of the service provision (for example, a game) from the application server 100 requests the AMF 241B to end the CDRX using the API (step S49).

The AMF 241B that has received the CDRX end request notifies the base station device 300B to end the CDRX at the CDRX end timing (step S45). In response to this, the base station device 300B sets the terminal device 400B to end the CDRX at the CDRX end timing.

As a result, the terminal devices 400A and 400B can end CDRX at the same CDRX end timing.

As described above, when the AF 249 determines the timing to start CDRX, the timing at which the AF 249 ends CDRX is also indicated. As a result, the base station device 300 can return to normal communication when the service provision by the application server 100 is terminated.

As described above, the AF 249 can control the start timing and the end timing of CDRX using the API. As a result, the application server 100 can deliver data (for example, AR/VR video data) to a plurality of terminal devices 400 belonging to different private networks while suppressing fluctuation in delay.

In addition, even in uplink, it is possible to further suppress fluctuation in delay of data reaching the application server 100 from a plurality of terminal devices 400 belonging to different private networks.

As a result, a plurality of terminal devices 400 belonging to different private networks can be operated in cooperation.

6. Fourth Embodiment

In the first to third embodiments, the method in which the AF 249 sets the CDRX mainly in the case of long DRX has been described as an example, but the CDRX includes two of long DRX and short DRX. The short DRX has a shorter cycle (CDRX cycle) of intermittently monitoring the PDCCH than the long DRX. When starting CDRX, the terminal device 400 first performs short DRX, and shifts from short DRX to long DRX when there is no transmission/reception packet addressed to the terminal device 400 itself for a predetermined period.

As described above, in order to align the CDRX in the plurality of terminal devices 400, it is necessary to align not only the CDRX start timing but also the timings of short DRX and long DRX, in other words, the timing of switching from short DRX to long DRX.

Therefore, in the fourth embodiment of the present disclosure, after CDRX is started at the CDRX start timing instructed by the AF 249, the AF 249 switches between short DRX and long DRX using the API.

Figure 23:
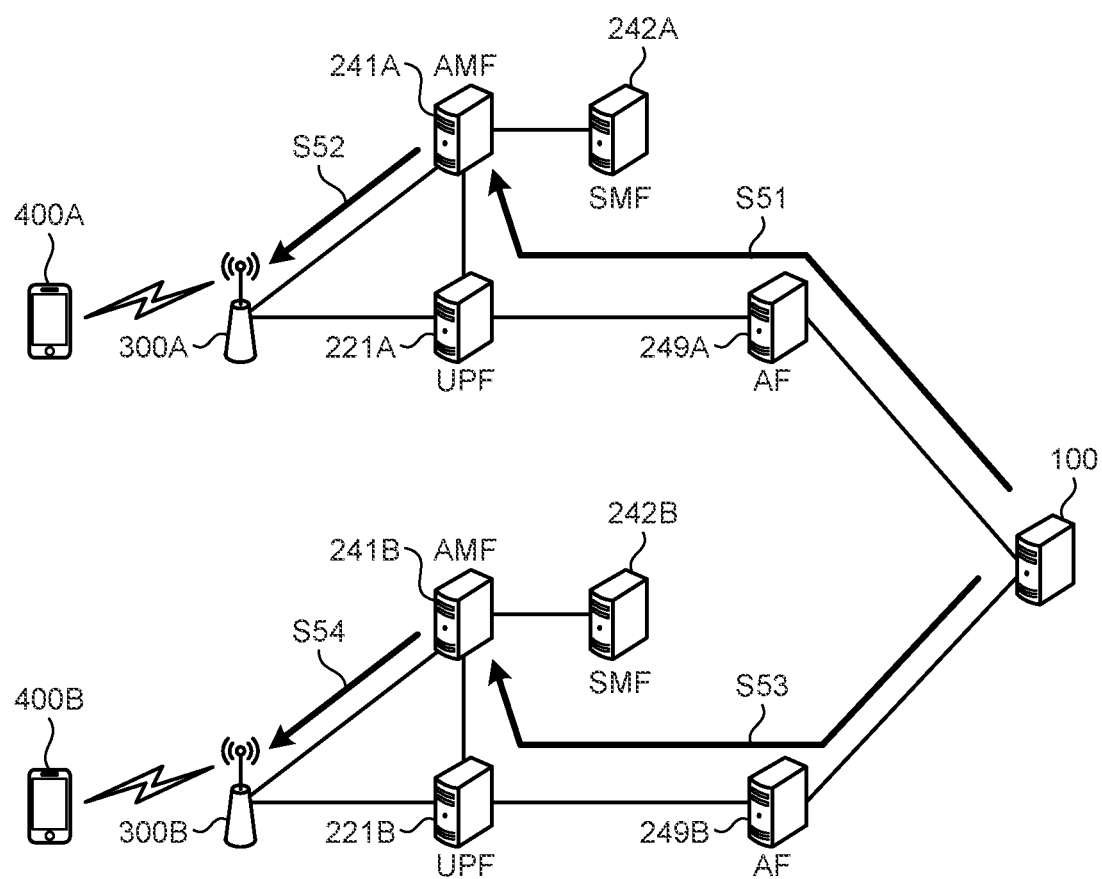
FIG. 23 is a diagram for describing an example of a flow of a switching process according to a fourth embodiment of the present disclosure.

An example of a process (hereinafter, also referred to as switching process) in which the AF 249 instructs switching of CDRX will be described with reference to FIG. 23. FIG. 23 is a diagram for describing an example of a flow of a switching process according to the fourth embodiment of the present disclosure.

As illustrated in FIG. 23, based on the notification from the application server 100, the AF 249A requests the AMF 241A to switch from short DRX to long DRX at the switching timing by using the API (step S51). The notification from the application server 100 includes, for example, a notification to interrupt transmission of data for a certain period or a notification to decrease the frame rate.

Upon receiving the switching request, the AMF 241A notifies the base station device 300A to switch CDRX from short DRX to long DRX at the switching timing (step S52). Upon receiving this, the base station device 300A sets the terminal device 400A to switch from short DRX to long DRX at the switching timing.

Similarly, based on the instruction from the application server 100, the AF 249B requests the AMF 241B to switch from short DRX to long DRX at the switching timing using the API (step S53). The notification from the application server 100 includes, for example, a notification to interrupt transmission of data for a certain period or a notification to decrease the frame rate.

Upon receiving the switching request, the AMF 241B notifies the base station device 300B to switch CDRX from short DRX to long DRX at the switching timing (step S53). The base station device 300B that has received this instruction sets the terminal device 400B to switch from short DRX to long DRX at the switching timing.

As described above, the AF 249 can control the switching timing of the short DRX and the long DRX using the API. As a result, the application server 100 can deliver data (for example, AR/VR video data) to a plurality of terminal devices 400 belonging to different private networks while suppressing fluctuation in delay.

In addition, even in uplink, it is possible to further suppress fluctuation in delay of data reaching the application server 100 from a plurality of terminal devices 400 belonging to different private networks.

As a result, a plurality of terminal devices 400 belonging to different private networks can be operated in cooperation.

Here, the AF 249 performs the switching control between the short DRX and the long DRX according to the notification from the application server 100, but the present invention is not limited thereto. For example, the AF 249 may monitor data addressed to the terminal device 400 and perform switching control if there is no data addressed to the terminal device 400 for a certain period of time.

7. Modification

The processing according to each of the above-described embodiments may be performed in various different forms (modifications) also in each of the above-described embodiments.

In the above embodiment, the AF 249 performs control related to CDRX (for example, setting of a CDRX cycle), but the present invention is not limited thereto. For example, an entity disposed outside the private network may perform control related to CDRX. This entity may be the application server 100, or may be an entity different from the application server 100.

Since the AF 249 is disposed inside the private network, it can directly access the API of the AMF 241 belonging to the same private network. However, in a case where an entity disposed outside the private network instructs the AMF 241 on the CDRX, it is not possible to directly connect to the API of the AMF 241. Therefore, in this case, an entity disposed outside the private network may be connected to the API of the AMF 241 via, for example, the gateway of the API of the NEF 245.

Furthermore, the control device that controls the terminal device 400, the base station device 300, or the information processing device 260 of the present embodiment may be realized by a dedicated computer system or may be realized by a general-purpose computer system.

For example, a program for executing the above-described operation is stored and distributed in a computer-readable recording medium such as an optical disk, a semiconductor memory, a magnetic tape, or a flexible disk. Then, for example, the program is installed in a computer, and the above-described processing is executed to configure the control device. At this time, the control device may be the terminal device 400, the base station device 300, or a device (for example, a personal computer) outside the information processing device 260. Furthermore, the control device may be an internal device (for example, the control unit 450, the control unit 340, or the control unit 263) of the terminal device 400, the base station device 300, or the information processing device 260.

In addition, the communication program may be stored in a disk device included in a server device on a network such as the Internet so that the communication program can be downloaded to a computer. In addition, the above-described functions may be realized by cooperation of an operating system (OS) and application software. In this case, a portion other than the OS may be stored in a medium and distributed, or a portion other than the OS may be stored in a server device and downloaded to a computer.

Among the processes described in the above embodiments, all or a part of the processes described as being performed automatically can be performed manually, or all or a part of the processes described as being performed manually can be performed automatically by a known method. In addition, the processing procedure, specific name, and information including various data and parameters illustrated in the document and the drawings can be arbitrarily changed unless otherwise specified. For example, the various types of information illustrated in each figure are not limited to the illustrated information.

In addition, each component of each device illustrated in the drawings is functionally conceptual, and is not necessarily physically configured as illustrated in the drawings. That is, a specific form of distribution and integration of each device is not limited to the illustrated form, and all or a part thereof can be functionally or physically distributed and integrated in an arbitrary unit according to various loads, usage conditions, and the like.

In addition, the above-described embodiments can be appropriately combined in a region in which the processing contents do not contradict each other. In addition, the order of each step illustrated in the sequence diagram or the flowchart of the present embodiment can be changed as appropriate.

Furthermore, for example, the present embodiment can be realized as any configuration constituting a device or a system, for example, a processor as a system large scale integration (LSI) or the like, a module using a plurality of processors or the like, a unit using a plurality of modules or the like, a set obtained by further adding other functions to a unit, or the like (that is, a configuration of a part of the device).

Note that, in the present embodiment, the system means a set of a plurality of components (devices, modules (parts), and the like), and it does not matter whether all the components are in the same housing. For example, a plurality of devices housed in separate housings and connected via a network or the like, and one device in which a plurality of modules is housed in one housing are both systems.

Furthermore, for example, the present embodiment can adopt a configuration of cloud computing in which one function is shared and processed by a plurality of devices in cooperation via a network.

(Effects)

The information processing device 260 (the AF 249 and the AMF 241) of the present disclosure includes the control unit 263. The control unit 263 acquires information from a device (the application server 100) that provides the terminal device 400 with an application function. The control unit 263 notifies the base station device 300 that communicates with the terminal device 400 of the setting information regarding the intermittent reception of the terminal device 400 using the API on the basis of the acquired information.

As a result, fluctuation in the delay can be further suppressed.

In addition, the control unit 263 may notify the base station device 300 of the setting information via a device (the AMF 241) that belongs to the core network 200 to which the base station device 300 is connected and has an NF function.

As a result, fluctuation in the delay can be suppressed by the AF 249.

Furthermore, the information processing device 260 may have a function related to access control.

As a result, delay fluctuation can be suppressed by the AMF 241.

Further, the setting information may include cycle information related to the reception cycle of the intermittent reception.

As a result, the information processing device 260 can set the reception cycle of the intermittent reception.

Further, the setting information may include start timing information related to the timing of starting the intermittent reception.

As a result, the information processing device 260 can set the start timing of the intermittent reception.

Further, the setting information may include end timing information related to the timing of ending the intermittent reception.

As a result, the information processing device 260 can set the end timing of the intermittent reception.

In addition, the setting information may include a switching timing related to a timing of switching the reception cycle (short DRX/long DRX) of the intermittent reception.

As a result, the information processing device 260 can set the timing for switching the reception cycle of the intermittent reception.

Furthermore, the control unit 263 may receive reception timing information regarding a reception timing at which the terminal device 400 receives data transmitted by the device (the application server 100) from the base station device 300 in the reception period of the intermittent reception.

As a result, the data transmission timing can be adjusted such that the terminal device 400 receives data at a desired reception timing.

Furthermore, the control unit 263 may transmit test data for measuring the reception timing to the base station device 300.

Consequently, the reception timing can be measured based on the test data.

Furthermore, the control unit 263 may adjust the transmission timing on the basis of the reception timing information such that the terminal device 400 receives data before a predetermined period in the reception period, and transmit the data.

As a result, the terminal device 400 can receive data at a desired timing.

Furthermore, the control unit 263 may request the base station device 300 to adjust the reception period such that the reception timing of the data transmitted by the device (the application server 100) at the terminal device 400 is earlier than a predetermined period in the reception period of the intermittent reception, and transmit test data for adjusting the reception period.

As a result, the base station device 300 can adjust the reception period of the intermittent reception using the test data.

Furthermore, the information acquired from the device (the application server 100) may include information regarding a plurality of terminal devices 400 connected to different core networks, and the control unit 263 may notify the base station device 300 that communicates with the terminal device 400 among the plurality of terminal devices 400 of the setting information on the terminal device 400 connected to the core network 200 to which the own device belongs.

As a result, the plurality of terminal devices 400 belonging to different core networks 200 can be operated in cooperation.

Furthermore, the information processing device (the application server 100) of the present disclosure includes a control unit. The control unit notifies an entity (the AF 249 and the AMF 241) belonging to the core network 200 to which the terminal device 400 is connected of information regarding the terminal device 400 that provides the application function. The information is used for setting intermittent reception of the terminal device 400 by the entity (the AF 249 and the AMF 241).

As a result, fluctuation in the delay can be suppressed.

Furthermore, the base station device 300 of the present disclosure includes the control unit 340. The control unit 340 receives setting information that is transmitted from an entity (the AF 249 and the AMF 241) belonging to the core network 200 on the basis of information from a device (the application server 100) that provides the terminal device 400 with an application function and that is related to intermittent reception of the terminal device. The control unit 340 sets the intermittent reception to the terminal device 400 on the basis of the setting information.

As a result, fluctuation in the delay can be suppressed.

Furthermore, the communication method of the present disclosure acquires information from a device (the application server 100) that provides the terminal device 400 with an application function, and notifies the base station device 300 that communicates with the terminal device 400 of setting information regarding intermittent reception of the terminal device 400 on the basis of the information by using an API.

As a result, fluctuation in the delay can be suppressed.

Furthermore, the communication system 1 of the present disclosure is a communication system including: the base station device 300 that communicates with the terminal device 400; the information processing device 260 (the AF 249 and the AMF 241); and a device that provides an application function (the application server 100), in which the information processing device 260 includes a control unit that acquires information from the device that provides the application function, and notifies the base station device 300 of setting information regarding intermittent reception of the terminal device 400 using an API on the basis of the information.

As a result, fluctuation in the delay can be suppressed.

Although the embodiments of the present disclosure have been described above, the technical scope of the present disclosure is not limited to the above-described embodiments as it is, and various modifications can be made without departing from the gist of the present disclosure. In addition, components of different embodiments and modifications may be appropriately combined.

Furthermore, the effects described in the present specification are merely examples and are not limited, and other effects may be provided.

Note that the present technology can also have the following configurations.

(1)

An information processing device comprising:

a control unit configured to:

acquire information from a device that provides an application function for a terminal device; and notify a base station device that communicates with the terminal device of setting information regarding intermittent reception of the terminal device using an application programming interface (API) on the basis of the information.

(2)

The information processing device according to (1), wherein the control unit notifies the base station device of the setting information via a device that belongs to a core network to which the base station device is connected and has a network function (NF).

(3)

The information processing device according to (1), wherein the information processing device has a function related to access control.

(4)

The information processing device according to any one of (1) to (3), wherein the setting information includes cycle information regarding a reception cycle of the intermittent reception.

(5)

The information processing device according to any one of (1) to (4), wherein the setting information includes start timing information regarding a timing to start the intermittent reception.

(6)

The information processing device according to any one of (1) to (5), wherein the setting information includes end timing information regarding a timing at which the intermittent reception ends.

(7)

The information processing device according to any one of (1) to (6), wherein the setting information includes switching timing information regarding a timing for switching a reception cycle of the intermittent reception.

(8)

The information processing device according to any one of (1) to (7), wherein the control unit receives, from the base station device, reception timing information related to a reception timing at which the terminal device receives data transmitted by the device in the reception period of the intermittent reception.

(9)

The information processing device according to (8), wherein the control unit transmits test data for measuring the reception timing to the base station device.

(10)

The information processing device according to (8) or (9), wherein the control unit adjusts a transmission timing on the basis of the reception timing information such that the terminal device receives the data before a predetermined period in the reception period, and transmits the data.

(11)

The information processing device according to any one of (1) to (7), wherein the control unit is configured to:

request the base station device to adjust the reception period such that a reception timing of the data transmitted by the device at the terminal device is earlier than a predetermined period in the reception period of the intermittent reception, and transmit test data for performing the adjustment of the reception period.

(12)

The information processing device according to any one of (1) to (11), wherein the information includes information on a plurality of terminal devices connected to different core networks, and the control unit notifies the base station device that communicates with the terminal device of the setting information on the terminal device connected to the core network to which the terminal device belongs among the plurality of terminal devices.

(13)

An information processing device comprising:

a control unit configured to notify an entity belonging to a core network to which a terminal device that provides an application function is connected of information regarding the terminal device, wherein the information is used for setting intermittent reception of the terminal device by the entity.

(14)

A base station device comprising:

a control unit configured to:

receive setting information that is transmitted from an entity that belongs to a core network on the basis of information from a device that provides an application function to a terminal device, the setting information being related to intermittent reception of the terminal device; and set the intermittent reception to the terminal device on the basis of the setting information.

(15)

A communication method, comprising:

acquiring information from a device that provides an application function to a terminal device; and notifying a base station device that communicates with the terminal device of setting information regarding intermittent reception of the terminal device using an application programming interface (API) on the basis of the information.

(16)
A communication system comprising:
a base station device that communicates with a terminal device;
an information processing device; and
a device that provides an application function, wherein the information processing device includes:
a control unit configured to:
acquire information from a device that provides the application function; and
notify the base station device of setting information regarding intermittent reception of the terminal device using an application programming interface (API) on the basis of the information.

REFERENCE SIGNS LIST

1 COMMUNICATION SYSTEM
100 APPLICATION SERVER (INFORMATION PROCESSING DEVICE)
200, 200A, 200B CORE NETWORK
241 AMF
249 AF
300, 300A, 300B BASE STATION DEVICE
400, 400A, 400B TERMINAL DEVICE

The invention claimed is:

1. A first information processing device, comprising:
a control unit configured to:
acquire first information from a second information processing device, wherein the second information processing device provides an application function to a terminal device;
notify, based on the first information, a base station device of setting information, wherein
the base station device communicates with the terminal device, and
the setting information is regarding intermittent reception of the terminal device using an application programming interface (API); and
receive, from the base station device, reception timing information related to a reception timing of the terminal device, wherein
the reception timing corresponds to a time at which the terminal device receives data transmitted by the second information processing device in a reception period of the intermittent reception.

2. The first information processing device according to claim 1, wherein
the control unit is further configured to notify notifies the base station device of the setting information via a device that belongs to a core network,
the base station device is connected to the core network, and
the device that belongs to the core network has a network function (NF).

3. The first information processing device according to claim 1, wherein
the first information processing device has a function related to access control.

4. The first information processing device according to claim 1, wherein
the setting information includes cycle information regarding a reception cycle of the intermittent reception.

5. The first information processing device according to claim 1, wherein
the setting information includes start timing information regarding a timing to start the intermittent reception.

6. The first information processing device according to claim 1, wherein
the setting information includes end timing information regarding a timing to end the intermittent reception.

7. The first information processing device according to claim 1, wherein
the setting information includes switching timing information regarding a timing for a switching process of a reception cycle of the intermittent reception.

8. The first information processing device according to claim 1, wherein
the control unit is further configured to transmit test data for measurement of the reception timing to the base station device.

9. The first information processing device according to claim 1, wherein the control unit is further configured to:
adjust a transmission timing based on the reception timing information such that the terminal device receives the data before a specific period in the reception period, and
transmit the data based on the adjusted transmission timing.

10. The first information processing device according to claim 1, wherein the control unit is further configured to:
request the base station device to adjust the reception period such that the reception timing, of the data transmitted by the second information processing device at the terminal device, is earlier than a specific period in the reception period of the intermittent reception, and
transmit test data for the adjustment of the reception period.

11. The first information processing device according to claim 1, wherein
the first information includes information on a plurality of terminal devices connected to a plurality of different core networks,
the plurality of terminal devices includes the terminal device, and
the terminal device is connected to a core network of the plurality of different core networks.

12. An information processing device, comprising:
a control unit configured to:
transmit an application function to a terminal device;
notify, an entity belonging to a core network, information regarding the terminal device, wherein
the terminal device is connected to the entity, and
the information is to set, by the entity, intermittent reception of the terminal device; and
transmit data to the terminal device, wherein the terminal device receives the transmitted data in a reception period of the intermittent reception.

13. A base station device, comprising:
a control unit configured to:
receive, based on first information, setting information that is transmitted from an entity that belongs to a core network, wherein
the first information is from a device that provides an application function to a terminal device, and
the setting information is related to intermittent reception of the terminal device;
set the intermittent reception of the terminal device based on the setting information; and
transmit, to the entity that belongs to the core network, reception timing information related to a reception timing of the terminal device, wherein the reception timing corresponds to a time at which the terminal device receives data transmitted by the device in a reception period of the intermittent reception.

14. A communication method, comprising:

acquiring first information from a second information processing device, wherein the second information processing device provides an application function to a terminal device;

notifying, based on the first information, a base station device of setting information, wherein the base station device communicates with the terminal device, and the setting information is regarding intermittent reception of the terminal device using an application programming interface (API); and receiving, from the base station device, reception timing information related to a reception timing of the terminal device, wherein the reception timing corresponds to a time at which the terminal device receives data transmitted by the second information processing device in a reception period of the intermittent reception.

15. A communication system, comprising:

a terminal device;

a base station device configured to communicate with the terminal device;

a first information processing device; and a second information processing device configured to provide an application function to the terminal device, wherein the first information processing device includes:

a control unit configured to:

acquire first information from the second information processing device;

notify, based on the first information, the base station device of setting information, wherein the setting information is regarding intermittent reception of the terminal device using an application programming interface; and receive, from the base station device, reception timing information related to a reception timing of the terminal device, wherein the reception timing corresponds to a time at which the terminal device receives data transmitted by the second information processing device in a reception period of the intermittent reception.

* * * * *